US010997794B2

(12) United States Patent
Kelly et al.

(10) Patent No.: US 10,997,794 B2
(45) Date of Patent: May 4, 2021

(54) OPTICAL MEASURING AND SCANNING SYSTEM AND METHODS OF USE

(71) Applicant: VIDI PTY LTD, Thornlands (AU)

(72) Inventors: John Kelly, Thornlands (AU); Ben Tam, Balmain (AU); Lee Blattmann, Balmain (AU)

(73) Assignee: VIDI PTY LTD, Thornsland (AU)

( * ) Notice: Subject to any disclaimer, the term of this patent is extended or adjusted under 35 U.S.C. 154(b) by 240 days.

(21) Appl. No.: 16/197,519

(22) Filed: Nov. 21, 2018

(65) Prior Publication Data

US 2019/0108687 A1    Apr. 11, 2019

Related U.S. Application Data

(63) Continuation of application No. PCT/AU2017/050493, filed on May 26, 2017.

(30) Foreign Application Priority Data

Jun. 1, 2016  (AU) ................................ 2016902112

(51) Int. Cl.
*G06T 19/20* (2011.01)
*G06T 7/00* (2017.01)
(Continued)

(52) U.S. Cl.
CPC .......... *G06T 19/20* (2013.01); *G06K 9/00214* (2013.01); *G06K 9/00281* (2013.01);
(Continued)

(58) Field of Classification Search
CPC ........... G06T 19/20; G06T 7/75; G06T 7/593; G06T 7/00; G06T 7/0012; G06T 7/60;
(Continued)

(56) References Cited

U.S. PATENT DOCUMENTS

| 5,280,312 A | 1/1994 | Yamada et al. |
| 5,650,815 A * | 7/1997 | Dasso ................. H04N 13/221 348/42 |

(Continued)

FOREIGN PATENT DOCUMENTS

| EP | 2772795 A1 | 9/2014 |
| WO | 0188654 A2 | 11/2001 |
| WO | 2008009355 A1 | 1/2008 |

OTHER PUBLICATIONS

Extended European Search Report issued by the European Patent Office in relation to European Application No. 17805383.1 dated Jan. 8, 2020 (8 pages).

(Continued)

*Primary Examiner* — Manav Seth
(74) *Attorney, Agent, or Firm* — Robert P. Michal, Esq.; Carter, DeLuca & Farrell LLP

(57) ABSTRACT

An optical measuring system for fitting spectacles to a subject and/or for diagnosing and/or monitoring ocular diseases and/or disorder in the subject, and methods of use thereof. The system includes at least one image capturing device for capturing at least one image of at least part of the face of the subject. The system also includes at least one movable mount for mounting the image capturing device in front of the subject and moving the image capturing device relative to the subject; and at least one processor operatively connected to the image capturing device for generating a three dimensional (3D) model of the at least part of the face of the subject. The at least one processor is also configured to determine, from the 3D model generated, one or more optical measurements of the subject.

20 Claims, 8 Drawing Sheets

(51) Int. Cl.
*G06T 7/60* (2017.01)
*G06T 7/593* (2017.01)
*G06K 9/00* (2006.01)
*G06T 7/73* (2017.01)
*H04N 13/275* (2018.01)
*G06T 15/08* (2011.01)

(52) U.S. Cl.
CPC .............. *G06T 7/00* (2013.01); *G06T 7/0012* (2013.01); *G06T 7/593* (2017.01); *G06T 7/60* (2013.01); *G06T 7/75* (2017.01); *G06T 15/08* (2013.01); *H04N 13/275* (2018.05); *G06T 2207/10012* (2013.01); *G06T 2207/30041* (2013.01); *G06T 2207/30201* (2013.01); *G06T 2207/30204* (2013.01); *G06T 2219/2004* (2013.01)

(58) Field of Classification Search
CPC ........... G06T 15/08; G06T 2207/10012; G06T 2207/30041; G06T 2207/30201; G06T 2207/30204; G06T 2219/2004; H04N 13/275; G06K 9/00214; G06K 9/00281
See application file for complete search history.

(56) References Cited

U.S. PATENT DOCUMENTS

| | | | | |
|---|---|---|---|---|
| 6,231,188 | B1* | 5/2001 | Gao | G02C 13/003 351/227 |
| 6,523,955 | B1* | 2/2003 | Eberl | G02B 27/017 348/E9.026 |
| 6,692,127 | B2* | 2/2004 | Abitbol | G02C 13/005 351/227 |
| 7,016,824 | B2* | 3/2006 | Waupotitsch | G02C 13/003 345/419 |
| 7,740,355 | B2* | 6/2010 | Sessner | G02C 13/005 351/204 |
| 9,286,715 | B2* | 3/2016 | Coon | G06T 19/20 |
| 9,304,332 | B2* | 4/2016 | Fonte | G02C 13/001 |
| 9,311,746 | B2* | 4/2016 | Gravois | G06K 9/00221 |
| 9,378,584 | B2* | 6/2016 | Gravois | G06T 17/30 |
| 9,589,340 | B2* | 3/2017 | Guerin | G02C 13/003 |
| 9,628,697 | B2* | 4/2017 | Choukroun | A61B 3/0025 |
| 10,031,350 | B2* | 7/2018 | Fonte | G06Q 30/0621 |
| 10,031,351 | B2* | 7/2018 | Fonte | A61B 3/0041 |
| 10,120,207 | B2* | 11/2018 | Le Gallou | G02C 13/005 |
| 10,222,635 | B2* | 3/2019 | Fonte | B29D 12/02 |
| 10,330,958 | B2* | 6/2019 | Fonte | G06F 30/00 |
| 10,451,900 | B2* | 10/2019 | Fonte | B29D 12/02 |
| 10,459,256 | B2* | 10/2019 | Fonte | G06T 19/20 |
| 10,685,457 | B2* | 6/2020 | Cook | G09G 3/00 |
| 10,698,236 | B2* | 6/2020 | Fonte | H04L 65/403 |
| 10,714,217 | B2* | 7/2020 | Seriani | A61B 3/0033 |
| 10,734,114 | B2* | 8/2020 | Seriani | A61B 3/0033 |
| 2003/0123026 | A1* | 7/2003 | Abitbol | G06Q 30/0641 351/204 |
| 2006/0066469 | A1 | 3/2006 | Foote et al. | |
| 2014/0354948 | A1 | 12/2014 | Kratzer et al. | |
| 2016/0143524 | A1 | 5/2016 | Berard et al. | |
| 2019/0033624 | A1* | 1/2019 | Breuninger | G02C 13/005 |
| 2020/0211218 | A1* | 7/2020 | Le Gallou | G06T 7/73 |
| 2020/0393896 | A1* | 12/2020 | Li | G06F 3/013 |

OTHER PUBLICATIONS

Visioffice 2 System, retrieved from the Internet Mar. 8, 2017, <URL: https://essilorusa.com/content/dam/essilorusa/industry-services/devices-and-technology/visioffice2/LDMD000054_Visioffice2_SA.pdf> published 2015 as per copyright notice on document.

Visioffice and Varilux S Series Measurement Explanations, retrieved from the Internet, <URL: https://essilorusa.com/content/dam/essilorusa/industry-services/devices-and-technology/visioffice2/Visioffice%20Measurement%20FAQ.pdf> published Dec. 2012 as per note on front page.

Dispensing tools & instruments—Product Catalogue 2014/2015, retrieved Mar. 8, 2017, <URL:https://www.zeiss.com.au/content/dam/Vision/Vision/International/Pdf/en/dti/zeiss-DTI-Sales-Folder-Premium-Line-201415_web.pdf>, published 2014/2015 as per front page.

iFit Dispensing System, retrieved from the Internet Mar. 8, 2017, <URL: http://www.luzerneoptical.com/top-wholesale-optical-labs/new-products/individualized-customized-lens-measurement-systems/ifds-ifit-dispensing-system.html?sl=EN> published Sep. 11, 2015 as per note at bottom right of each page.

Simplicity with Zeiss Essential Line, retrieved Mar. 8, 2017, <URL: https://www.zeiss.com.au/content/dam/Vision/Vision/International/Pdf/en/dti/zeiss-DTI-Sales-Folder-Essential-Line-201415_web.pdf> published 2014/2015 as per front page of document.

M'eye Fit Touch, retrieved from the Internet Mar. 8, 2017, <URL: https://web.archive.org/web/20140905041423/http://www.essilorinstrumentsusa.com/SiteCollectionDocuments/4pagesA4_MeyeTouch_ENG.pdf> published Sep. 5, 2014 as per Wayback Machine.

OptikamPad Measurements, retrieved from the Internet Mar. 8, 2017, URL: https://web.archive.org/web/20151212141359/http://www.optikam.com/products/optika mpad/measurements/> published Dec. 12, 2015 as per Wayback Machine.

Avudaina Yagam, K., V., et. al., Simple method to measure the visual axis of the human eye, Optics Letters, vol. 36, No. 10, May 15, 2011, pp. 1803-1805.

International Search Report issued by the Australian Patent Office acting as the International Searching Authority in relation to International Application No. PCT/AU2017/050493 dated Aug. 2, 2017 (5 pages).

Written Opinion of the International Searching Authority issued by the Australian Patent Office acting as the International Searching Authority in relation to International Application No. PCT/AU2017/050493 dated Aug. 2, 2017 (7 pages).

Australian Search Report issued by the Australian Government IP Australia acting as the International Searching Authority in relation to National Application No. 2016902112 dated Mar. 14, 2017 (15 pages).

* cited by examiner

OPTICAL MEASURING AND SCANNING SYSTEM AND METHODS OF USE

CROSS-REFERENCE TO RELATED APPLICATIONS

This application is a continuation of PCT International Application No. PCT/AU2017/050493 filed May 26, 2017, which claims priority to Australian Patent Application No. 2016902112, filed Jun. 1, 2016, the disclosure of each of these applications is expressly incorporated herein by reference in their entirety.

TECHNICAL FIELD

The present invention relates to a measuring system for fitting spectacles and intra-ocular and/or scleral lenses and to methods of use thereof. The present invention also concerns a scanning system for diagnosing and/or monitoring ocular diseases and/or disorders and methods of use thereof.

BACKGROUND

The process of fitting spectacles to an individual involves more than selection of a spectacle frame and suitable prescription lenses. To correctly fit spectacles, the spectacles must be tailored to fit the particular individual's unique physical characteristics, including head shape and size.

Measurements, such as, e.g., horizontal pupil distance, vertical pupil height, nose width, temple length and head width, must be taken, so that when the prescription lenses are edged to fit the spectacle frame the optical centres of the left and right prescription lenses at least align with the pupil positions of the individual.

Such measurements are sometimes crudely taken by hand with an optometrist or optician using a hand-held ruler or hand-drawn scale with hand-placed ink dots to take the measurements on the selected spectacle frame.

Typically, however, the measurements are taken using sophisticated mechanical devices, such as, e.g., a pupilometer or a digital centration device, in order to fashion correctly fitting spectacle frames. Such sophisticated mechanical devices, however, typically, require comprehensive training, and, in some cases, the employment of trained professionals, all at considerable expense.

Alternatively, an optometrist or optician may place a spectacle frame measuring device on the individual to take the measurements.

However, the inherent problem with taking measurements by hand or using such devices as described above is the potential for error in the measurements taken. Specifically, potential errors in crude hand-derived measurements, use of the devices, and/or in correlating the measurements taken using those devices to the spectacle frame selected by the individual.

Another problem with the above described practices and/or devices, is that they are typically incapable of determining more complex measurements, such as, e.g., the centre of rotation of each eye, which is becoming increasingly more important in the lens design process.

SUMMARY OF INVENTION

Embodiments of the present invention provide an optical measuring system and a method of use, which may minimize or overcome at least one of the problems or difficulties mentioned above, or which may provide the public with a useful or commercial choice.

According to a first aspect of the present invention, there is provided an optical measuring system for fitting spectacles to a subject, said system including:

at least one image capturing device for capturing at least one image of at least part of a face of the subject wearing the spectacles;

at least one movable mount for mounting the image capturing device in front of the subject and moving the image capturing device relative to the subject; and at least one processor operatively connected to the image capturing device, said processor configured to generate a three dimensional (3D) model of the at least part of the face of the subject wearing the spectacles and determine, based on the 3D model generated, one or more optical measurements, including at least one of the visual axis, the mechanical centre of rotation (MCOR) and the optical centre of rotation (OCR) of each eye of the subject.

According to a second aspect of the present invention, there is provided an optical measuring system for fitting spectacles to a subject, said system including:

at least one image capturing device for capturing at least one image of at least part of the spectacles and at least one image of at least part of a face of the subject wearing the spectacles;

at least one movable mount for mounting the image capturing device in front of the subject and moving the image capturing device relative to the subject; and at least one processor operatively connected to the at least one image capturing device, said processor configured to: generate 3D models of the at least part of the spectacles and the at least part of the face of the subject wearing the spectacles; align the 3D models generated; and determine, based on the 3D models once aligned, one or more optical measurements, including at least one of the visual axis, the MCOR and the OCR of each eye of the subject.

According to a third aspect of the present invention, there is provided an optical measuring system for fitting spectacles to a subject, said system including:

at least one machine recognisable tag associated with the spectacles;

at least one image capturing device for capturing at least one image of at least part of the spectacles and at least one image of at least part of a face of the subject wearing the spectacles;

at least one movable mount for mounting the image capturing device in front of the subject and moving the image capturing device relative to the subject; and at least one processor operatively connected to the image capturing device, said processor configured to: generate 3D models of the at least part of the spectacles and the at least part of the face of the subject wearing the spectacles; align the 3D models generated, based on the at least one machine recognisable tag; and determine, based on the 3D models once aligned, one or more optical measurements, including at least one of the visual axis, the MCOR and the OCR of each eye of the subject.

According to a fourth aspect of the present invention, there is provided an optical scanning system for diagnosing and/or monitoring ocular diseases and/or disorders in a subject, said system including:

at least one image capturing device for capturing at least one image of at least an eye region of the subject;

at least one movable mount for mounting the image capturing device in front of the subject and moving the image capturing device relative to the subject; and at least one processor operatively connected to the image capturing device, said processor configured to generate a three dimensional (3D) model of the at least an eye region of the subject for said diagnosing and/or said monitoring ocular diseases and/or disorders in the subject based on the 3D model generated.

Advantageously, the measuring system of the present invention provides an accurate way to determine measurements and correlate those measurements to the spectacle frame selected by the subject. Furthermore, by generating 3D models of the selected spectacle frame and/or the subject wearing the spectacle frame and not using some complicated and/or cumbersome fitting mechanism, the potential for error in measurements determined is greatly reduced resulting in a better fitting and functioning pair of spectacles and spectacle lenses. Moreover, by generating 3D models of the selected spectacle frame and/or the subject wearing the spectacle frame, the optical measuring system of the present invention is readily capable of determining more complicated measurements, such as, e.g., the visual axis, pantoscopic tilt, back vertex distance, frame wrap, head cape and the OCR. Such measurements are beyond the capabilities of most measuring devices used today or are overly complicated to determine.

As used herein, the term "spectacles" may encompass any eyewear in which prescription lenses need to be edged and fitted, such as, e.g., spectacles, eyewear, glasses, eyeglasses, sunglasses, safety glasses and the like.

Typically, spectacles include a pair of lenses and a frame for bearing the lenses.

The frame may include a frame front for holding the lenses in front of the eyes of a subject. The frame front may include left and right frame rims for holding the lenses, or may not (if rimless spectacles).

The left and right frame rims may include a lens groove or v-groove for at least partially receiving and holding a lens edge.

The frame front may further include a bridge extending between the frame rims if present or between the lenses, if rimless spectacles.

The frame may include temples extending from either end of the frame front to, in use, extend over and/or behind the ears of the subject to hold the frame and thereby the lenses in place.

Prior to the edging and fitting of prescription lenses, spectacles may be provided with lens inserts comprised of clear plastic or glass.

As used herein, the term "eye" refers to a human eye.

The eye is not a perfect sphere but rather is a fused two-piece unit. The eye includes a smaller frontal unit called the "cornea", which is linked to a larger white unit called the "sclera". The cornea is transparent and is more curved than the sclera.

The eye further includes coloured circular structure called the "iris" located within the sclera. The iris concentrically surrounds a pupil of the eye, which appears to be black. The size of the pupil, which controls the amount of light entering the eye, is adjusted by the iris' dilator and sphincter muscles.

Light enters the eye through the cornea, then the pupil and then through a lens controlled by ciliary muscles. The light then falls on light-sensitive cells located at the back of the eye called the "retina". The light-sensitive cells of the retina convert the light into electrical signals that are carried to the brain by the optic nerves.

The retina includes a small area responsible for providing very high visual acuity. This small area is called the "fovea centralis".

As used herein, the term "pupillary axis" refers to an imaginary line that extends through the centre of the pupil, the lens and the retina.

As used herein, the term "Purkinje images" refers to reflections of objects from the structure of the eye. They are also known as Purkinje reflexes and as Purkinje-Sanson images. Generally, at least four Purkinje images are usually visible. The "first Purkinje image" (P1), also known as a "corneal reflection" or "glint", is the reflection from the outer surface of the cornea. The "second Purkinje image" (P2) is the reflection from the inner surface of the cornea. The "third Purkinje image" (P3) is the reflection from the outer (anterior) surface of the lens. The "fourth Purkinje image" (P4) is the reflection from the inner (posterior) surface of the lens.

As used herein, the term "visual axis" refers to an imaginary line that extends from a sighted object through the centre of the pupil to the fovea centralis of an eye. Typically, the visual axis is understood to pass through the first Purkinje image of the eye. The visual axis is also known as "the line of sight".

As used herein, the term "mechanical centre of rotation of an eye" (MCOR) refers to a centre point within an eye that exhibits least movement when the eye moves within its orbit.

As used herein, the term "optical centre of rotation" (OCR) refers to a centre point within an eye that is derived from the MCOR and is located along the visual axis.

Generally, the at least part of the face of subject may include any part of the face of the subject required in determining the one or more optical measurements of the subject, preferably also at least one of monocular pupillary distance, pupil height, back vertex distance and pantoscopic tilt of the subject. For example, the at least part of the face may include an upper and/or middle portion of the subject's face, typically at least a lower portion of the forehead, the eyes, the temples, the bridge of the nose, at least an upper portion of the nose, the upper cheeks and/or at least part of the ears. In preferred embodiments, the at least part of the face of the subject may include a full height of the subject's face from chin to hairline.

Likewise, the at least part of the spectacles may include any portion that may assist in the fitting of the spectacles and/or in determining at least one of monocular pupillary distance, pupil height, back vertex distance and pantoscopic tilt of the subject. Typically, the at least part of the spectacles may include the frame front and/or at least part of the temples adjacent the frame front, preferably the frame front.

The lens inserts may or may not be removed from the spectacles prior to the capturing of the at least one image of the at least part of the spectacles, depending on the type of spectacles. For example, for rimless and partially rimmed spectacles, the lens inserts may not be removed until after the capturing of the at least one image of the at least part of the spectacles and prior to the capturing of the at least one image of the at least part of a face of the subject wearing the spectacles.

In other embodiments, image capturing of the at least part of the spectacles may include the imaging of the left and right frame rims, most preferably the lens groove or v-groove, if present.

The image capturing device may include any suitable device capable of capturing at least one image of an object, typically for generating a 3D model of the object from the at least one image.

The at least one image capturing device may be of any suitable size, shape and form. Typically, the at least one image capturing device may be capable of capturing a plurality of images and/or video, depending on the type of image capturing device.

For example, in some embodiments, the at least one image capturing device may include a camera, preferably a digital camera, more preferably a DSLR type camera.

For example, in other embodiments, the at least one image capturing device of the present invention may include a time-of-flight laser 3D scanner, a triangulation based 3D scanner, a structured-light 3D scanner or a modulated light 3D scanner. In some embodiments, the at least one image capturing device may include a near-infrared (IR) interferometer for near-IR spectroscopic analysis of the at least part of the face or eye region of the subject. In yet other embodiments, the at least one image capturing device may include a stereoscopic system including at least two, three, four, five, six, seven or eight cameras spaced apart or at least one camera with at least two, three, four, five, six, seven or eight spaced apart lenses, for example.

In embodiments in which the at least one image capturing device includes a stereoscopic system, the system may include at least two cameras, preferably at least four or at least six camera, spaced apart. Preferably, each camera may be a digital camera, more preferably a DSLR type camera.

In some embodiments, the at least one image capturing device may include at least one sensor. Depending on the type of image capturing device, the sensor may be at least one detector, such as, e.g., a charge-coupled device or positron sensitive device, or may be the at least one camera.

The at least one image capturing device may also include at least one emitter for emitting radiation in the form of visible light, near infrared (IR), IR or X-ray or soundwaves in the form of ultrasound.

In use, the at least one emitter may emit radiation or soundwaves that may be reflected off the at least part of the spectacles and/or the at least part of the face of the subject wearing the spectacles and sensed by the at least one sensor to capture an image of the at least part of the spectacles or face wearing the spectacles for generating a 3D model of the at least part of the spectacles or face.

For example, if used for gaze tracking or tracking the point of gaze (i.e., the line of sight associated with an eye or what an eye is looking at) over a period of time, the emitted radiation may be reflected from various boundaries of the eye and captured by the at least one image capturing device. One type of reflection that is tracked is the "glint" or the "first Purkinje image". Typically, at least two Purkinje images are captured by the image capturing device when gaze tracking or tracking the point of gaze, such as, e.g., the first and fourth Purkinje images (P1 and P4).

In some embodiments, the at least one image capturing device may include at least one emitter in the form of a light emitting diode (LED) for at least partially illuminating a portion of the subject and/or the spectacles. Preferably, the at least one LED may be an RGB LED. More preferably, the at least one image capturing device may include a plurality of RGB LEDs arranged in an array and configured to at least partially illuminate the at least part of the face of subject, preferably the eyes of the subject, more preferably the cornea of each eye of the subject.

In other embodiments, the at least one image capturing device may include at least one emitter in the form of an infrared (IR) emitting diode or near IR emitting diode for at least reflecting off the various boundaries of the eye. Advantageously, IR light or near IR light can illuminate an eye without disturbing a viewer and is reflected well by the cornea or by other parts of the eye (e.g., the pupil), and is thus more readily captured by the at least one image capturing device.

The at least one image capturing device may preferably include a body for housing the at least one sensor and the at least one emitter, if present. The body may be of any suitable size, shape and construction to be mounted to the at least one movable mount, preferably detachably. In some embodiments, the body may include at least one handle for handling of the at least one image capturing device.

Typically, the body may have a substantially triangular, rectangular, square, circular, semi-circular or bilobal cross-sectional shape. The body may preferably have a subject-facing surface, an opposed outward facing surface, opposed side edges, an upper edge and an opposed lower edge.

The at least one sensor and the at least one emitter, if present, may each be located at least partially in or on the subject-facing surface of the image capturing device. In embodiments in which the at least one image capturing device includes a stereoscopic system including at least two cameras, each camera may be located at or near a side edge of the body or at or near the upper edge or opposed lower edge.

In some embodiments, the system may include more than one image capturing device. For example, the system may include at least two, at least three, at least four, at least five, at least six, at least seven or at least eight image capturing devices.

In one such preferred embodiment, the system may include a first image capturing device mounted to the at least one movable mount for capturing at least one image of the at least part of a face of a subject wearing the spectacles, and a second image capturing device for capturing at least one image of the at least part of the spectacles.

The second image capturing device may be of any suitable size, shape and form as described above. The second image capturing device may preferably be a hand-held 3D scanner, for example.

As described above, in some embodiments, the system includes at least one machine recognisable tag associated with the spectacles.

The at least one machine recognisable tag may be of any suitable size, shape and form capable of being recognised by the at least one processor when aligning 3D models of the at least part of the spectacles and the at least part of the face of the subject wearing the spectacles. The at least one machine recognisable tag may be associated with the spectacles in any suitable way.

For example, in some embodiments, the at least one machine recognisable tag may include a mark such as, e.g., a character or symbol, attached to the at least part of the spectacles, preferably a frame front of the spectacles. The tag may be wrapped around or adhered or attached to the at least part of the spectacles, preferably adhered.

In preferred embodiments, the at least one machine recognisable tag may be in the form of an adhesive label having an adhesive surface and an opposed outer surface on which the mark is presented.

In some embodiments, the at least one machine recognisable tag may include a barcode or radio-frequency identification (RFID) tag configured to further be read by a reader operatively associated with the at least one image capturing device and/or the at least one processor when generating and/or aligning 3D models of the at least part of the spectacles and the at least part of the face of the subject wearing the spectacles. The barcode or RFID tag may be programmed with the subject's details (i.e., name, date of birth, contact details, prescription history, etc.), for example.

In some embodiments, the systems may include more than one machine recognisable tag. For example, at least two, at least three, at least four, at least five or more machine recognisable tags may be associated with the spectacles. Each machine recognisable tag may bear the same marking or different markings.

In preferred embodiments, the system may include at least three machine recognisable tags associated with the spectacles. The at least three machine recognisable tags may be associated with the spectacles in any suitable arrangement. Typically, each machine recognisable tag, in the form of an adhesive label, may be adhered to a portion of the frame front of the spectacles. Preferably, the at least three machine recognisable tags may be adhered to a portion of the frame front to form a triangle. For example, a first and a second machine recognisable tag may be respectively adhered to lower outer portions of the left and right frame rims of the spectacles, a third machine recognisable tag may be adhered to a bridge of the spectacles. Advantageously, the formation of a triangle assists in the latter alignment of the 3D model of the at least part of the spectacles with the 3D model of the at least part of the face of the subject as the triangle forms a plane that can be aligned with a plane formed by a same triangle in the 3D model of the at least part of the face of the subject.

The system includes at least one movable mount for mounting the image capturing device in front of the subject and moving the image capturing device relative to the subject. The mount may be of any suitable size, shape and construction and formed from any suitable material or materials, typically plastic, rubber and/or metal materials.

The at least one mount may be located, arranged or distanced any suitable distance from the subject to allow the at least one image capturing device to capture at least one image of the at least part of the subject, preferably the at least one mount may be located in front of the subject.

For example, in some embodiments, the mount may be at least 200 mm, at least 250 mm, at least 300 mm, at least 350 mm, at least 400 mm, at least 450 mm, at least 500 mm, at least 550 mm, at least 600 mm, at least 650 mm, at least 700 mm, at least 750 mm, at least 800 mm, at least 850 mm, at least 900 mm, at least 950 mm, at least 1,000 mm, at least 1,050 mm, at least 1,100 mm, at least 1,150 mm, at least 1,200 mm, at least 1,250 mm, at least 1,300 mm, at least 1,350 mm, at least 1,400 mm, at least 1,450 mm, at least 1,500 mm, at least 1,550 mm, at least 1,600 mm, at least 1,650 mm, at least 1,700 mm, at least 1,750 mm, at least 1,800 mm, at least 1,850 mm, at least 1,900 mm, at least 1,950 mm, at least 2,000 mm, at least 2,050 mm, at least 2,100 mm, at least 2,150 mm, at least 2,200 mm, at least 2,250 mm, at least 2,300 mm, at least 2,350 mm, at least 2,400 mm, at least 2,450 mm, at least 2,500 mm, at least 2,550 mm, at least 2,600 mm, at least 2,650 mm, at least 2,700 mm, at least 2,750 mm, at least 2,800 mm, at least 2,850 mm, at least 2,900 mm, at least 2,950 mm or at least 3,000 mm from the subject. Typically, the mount be located or positioned in front of the subject at a distance of between about 500 mm and 1,500 mm from the subject, preferably between about 500 mm and about 1,125 mm.

The mount may include at least one elongate support, a mounting portion extending from a first end portion of the at least one elongate support and a base extending from an opposed second end portion of the at least one elongate support. The mounting portion and the base may each be integrally formed with the elongate support or may be separate mount pieces.

The base may be configured to rest on a support surface (such as, e.g., a floor, desk or table) and hold the elongate support in substantially vertical position. The base may be fixed or moveable on the support surface. The base may preferably include at least one movement mechanism for moving the base and thereby the mount and the image capturing device when attached to the mount. This will be discussed in further detail below.

The mounting portion may be of any suitable size, shape and form to connect with the at least one image capturing device, preferably detachably.

For example, in some embodiments, the mounting portion may be the form of a holder configured to at least partially receive and hold the at least one image capturing device.

In other embodiments, the mounting portion may include or be in the form of a substantially flat member having a device abutting surface configured to abut against and be releasably fastened to at least the mount facing surface of the image capturing device with one or more releasable fasteners. The one or more releasable fasteners may include one or more mechanical fasteners (such as, e.g., snap fasteners) and/or one or more chemical fasteners (such as, e.g., a wet adhesive, a dry adhesive or a double-sided adhesive tape).

In yet other embodiments, the mounting portion and the at least one image capturing device may be connected by a connecting mechanism or part of a connecting mechanism. For example, a first part of the connecting mechanism associated with the mounting portion may mate or engage with a second part of the connecting mechanism associated with the at least one image capturing device, preferably at least the mount facing surface of the image capturing device.

The connecting mechanism may include mateable male and female portions that couple together, including hook-and-loop type connections, threaded connections, interference fit (snap fit) connections or bayonet-type connections, for example. The connecting mechanism may include a male formation associated with the mounting portion configured to be inserted into or coupled with a female formation associated with the mount facing surface of the image capturing device. Conversely, the connecting mechanism may include a female formation associated with the mounting portion configured to at least partially receive or be coupled with a male formation associated with the mount facing surface of the image capturing device.

The at least one elongate support may, in use, extend in a substantially vertical direction from the base. Preferably, the at least one elongate support may be of a length such that the image capturing device is positioned substantially at face level with the subject.

The vertical position or height of the image capturing device may be adjustable.

In some embodiments, a longitudinal length or height of the elongate support may be adjustable to, in use, adjust the height of the at least one image capturing device. The longitudinal length or height of the elongate support may be adjustable by any suitable means.

For example, in one embodiment, the elongate support may be in the form of a linear actuator capable of moving between an extended position and a retracted position. The linear actuator may be manually moved between the extended position and the retracted position or may be powered (e.g., by an electric motor).

For example, in another embodiment, the elongate support may include two or more telescopic members capable of moving between an extended position and a retracted position. The telescopic members may be manually moved between the extended and retracted positions or may be driven by a linear actuator, preferably powered by an electric motor.

In other embodiments, the mounting portion of the mount may be vertically movable relative to the at least one elongate support to adjust the height of the at least one image capturing device. The mounting portion of the mount may be vertically movable relative to the elongate support by any suitable means.

For example, in one embodiment, the at least one elongate member may include a female formation in the form of an elongate channel or groove at least partially extending along a longitudinal length of the elongate member and the mounting portion may include a male formation in the form of a retaining member with an enlarged head or other type of retaining end at each end of the rail. The enlarged head or other type of retaining end of each retaining member may be configured to engage and be retained within the elongate channel or groove and be movable relative to the elongate channel or groove, preferably slideable.

The elongate channel or groove may be of any suitable cross-section, such as, e.g., C-shaped or U-shaped.

The mounting portion may be of any suitable size, shape and form as described above and may be movably coupled to the rail in any suitable way such that the mounting portion and the at least one image capturing device when mounted may be movable in a vertical direction along a height of the elongate member, preferably slideable.

The mounting portion and the at least one image capturing device when mounted may be manually moved in a vertical direction relative to the elongate member or may be powered by a movement mechanism, such as, e.g., one or more servomechanisms operatively associated with the mounting portion and/or the elongate member and including at least one servomotor.

In another embodiment, the elongate member may include a rail and the mounting portion of the mount may include one or more wheels or rollers for moving the mounting portion along a longitudinal length or height of the at least one elongate support. The rail may be of a size, shape and construction that prevents lateral movement or separation of the mounting portion away from the rail. The mounting portion may be manually moved along the rail or may be driven, e.g., by one or more servomechanisms operatively associated with one or more of the wheels or rollers and including at least one servomotor.

In yet another embodiment, the mounting portion may be movable along a longitudinal length or height of the at least one elongate support by way of a rack and pinion system. The at least one elongate support may include one or more racks extending along a longitudinal length or height of the elongate support, and the mounting portion may include one or more pinions each engageable with a corresponding rack for moving the mounting portion relative to the at least one elongate support. As with the rail, each rack and pinion may be engageable in such a way that allows movement of the mounting portion along the longitudinal length or height of the elongate support without lateral movement or separation of the mounting portion away from the racks. Again, the mounting portion may be manually moved along the one or more racks extending along a longitudinal length or height of the elongate support or may be driven, e.g., by one or more servomechanisms operatively associated with one or more of the pinions and including at least one servomotor.

As indicated above, the base may further include at least one movement mechanism for moving the base and thereby the mount and the image capturing device when attached to the mount. The mount and the at least one image capturing device may be manually moveable or may move automatically (i.e., self-propelled).

The mount and the at least one image capturing device may be moveable in any suitable direction relative to the subject, which may assist in imaging and the generation of 3D models. For example, in one embodiment, the mount may be able to move the image capturing device laterally or sideways relative to the subject. In another embodiment, the mount may be able to move the image capturing device in a longitudinal direction towards and away from the subject.

Typically, the mount may be movable such that the at least one image capturing device may be able to image a substantial portion of the at least part of the face of the subject. For example, the mount may be movable such that the at least one image capturing device may be able to image the at least part of the face of the subject over a range of at least 90°, at least 100°, at least 110°, at least 120°, at least 130°, at least 140°, at least 150°, at least 160°, at least 170°, at least 180°, at least 190°, at least 200°, at least 210°, at least 220°, at least 230°, at least 240°, at least 250°, at least 260°, at least 270°, at least 280°, at least 290°, at least 300°, at least 310°, at least 320°, at least 330°, at least 340°, at least 350° or even 360° about the subject, preferably at least 90°.

In some embodiments, the at least one movement mechanism may include wheels, rollers or tracks located on an underside of the base. The wheels, rollers or tracks may be capable of moving the mount and the image capturing device across or along a support surface. The wheels, rollers or tracks may be manually moved or may be driven, e.g., by one or more electric motors.

In preferred embodiments, the system may include a rail extending along a support surface and the base may include wheels or rollers located on an underside of the base for moving the mount and the image capturing device along the rail relative to the subject. Again, the wheels or rollers may be manually moved or may be driven, e.g., by one or more electric motors.

The rail may include any form of guided or directional conveyance. For example, the rail may include a track. The rail may of any suitable size, shape and construction and may be formed from any suitable material or materials. Likewise, the rail may be arranged in any suitable arrangement along a support surface that assists in imaging, generation of 3D models and determination of the one or more optical measurements of the subject.

For example, in some embodiments, the rail may extend at least in a lateral direction at least in front of the subject. The rail may extend in a linear or curvilinear direction at least in front of the subject.

In one embodiment, the rail may be curvilinear and extend in a curve or arc. The curve or arc may extend at least partially about at least a front of the subject such that a centre of curvature of the curve or arc is defined at or near the subject.

In another embodiment, the rail may be linear. In such an embodiment, one or more linear segments of rail may extend at least partially about or across a front of the subject.

In some embodiments, the system may include more than one segment of rail extending in a lateral direction at least in front of the subject.

For example, in one embodiment, the system may include at least two parallel segments of rail both extending in a lateral direction at least in front of the subject at different distances from the subject. In another embodiment, the system may include at least two parallel curves or arcs of rail extending at least partially about at least a front of the subject at different distances from the subject.

In other embodiments, the at least one mount may include: at least two elongate members spaced apart from one another in a lateral direction in front of the subject, each elongate member extending in a substantially vertical direction from a base as described above; a rail extending between and movably coupled to the at least two elongate members; and a mounting portion for mounting the at least one image capturing device, said mounting portion being movably coupled to the rail.

The rail may be movably coupled to the at least two elongate members in any suitable way such that the rail may be movable in a vertical direction between the at least two elongate members, preferably slideable.

For example, in one embodiment, each elongate member may include a female formation in the form of an elongate channel or groove at least partially extending along a longitudinal length of the elongate member and the rail may include a male formation in the form of a retaining member with an enlarged head or other type of retaining end at each end of the rail. The enlarged head or other type of retaining end of each retaining member may be configured to engage and be retained within the elongate channel or groove and be movable relative to the elongate channel or groove, preferably slideable.

The elongate channel or groove may be of any suitable cross-section, such as, e.g., C-shaped or U-shaped as previously described.

The mounting portion may be of any suitable size, shape and form as described above and may be movably coupled to the rail in any suitable way such that the mounting portion and the at least one image capturing device when mounted may be movable in a horizontal direction along a length of the rail, preferably slideable.

For example, in one embodiment, the rail, like the at least two elongate members, may include a female formation in the form of an elongate channel or groove as described above and the mounting portion may include a male formation in the form of one or more retaining members with enlarged heads or other types of retaining ends as described above. The enlarged head or other type of retaining end of each retaining member may be configured to engage and be retained within the elongate channel or groove and be movable relative to the elongate channel or groove, preferably slideable.

The rail may be manually moved in a vertical direction relative to the at least two elongate members or may be powered by a movement mechanism, such as, e.g., one or more servomechanisms operatively associated with the rail and including at least one servomotor.

Likewise, the mounting portion and the at least one image capturing device when mounted may be manually moved in a horizontal direction relative to the rail or may be powered by a movement mechanism, such as, e.g., one or more servomechanisms operatively associated with the mounting portion or the rail and including at least one servomotor.

To improve or enhance imaging of the spectacles, the system in some embodiments may further include a contrast agent applicator for applying a contrast agent to the spectacles prior to image capturing. The applicator may be of any suitable size, shape and construction and the contrast agent may be of any suitable type capable of being applied to the spectacles to enhance imaging of the spectacles and subsequent 3D models of the spectacles generated from the imaging. Preferably, the contrast agent may be a dry granular material or materials that is/are inert and safe to handle (e.g., talc, corn flour and similar granular materials).

The applicator may be in the form of a nozzle for applying the contrast agent to the spectacles or may be in the form of a container for containing the contrast agent and in to which the spectacles may be at least partially immersed.

The at least one processor of the system may be of any suitable configuration and type. The at least one processor may be operably associated with the at least one image capturing device and/or the at least one movement mechanism of the mount in any suitable way.

For example, in some embodiments, the at least one image capturing device and/or the at least one movement mechanism may include or share the at least one processor.

In preferred embodiments, the at least one processor may be an external processing device, such as, e.g., a computer, tablet, smart phone, smart watch or PDA. The at least one image capturing device and/or the at least one movement mechanism of the mount may be connected to the external processing device in any suitable way. Preferably, the external processing device may include at least one display and a user interface.

The at least one processor may preferably be operably coupled to a memory storage medium for executing one or more operating programs stored on the memory storage medium (i.e., 3D model generation and alignment), accessing images stored on the memory storage medium and/or for determining one or more measurements.

Typically, the at least one image capturing device and/or the at least one movement mechanism may each include or share a communication module for connecting to the external processing device.

In some embodiments, the communication module may be in the form of a port or access point (e.g., USB or mini-USB port) such that the at least one image capturing device and/or the at least one movement mechanism may be connected to the external processing device using a suitable cable.

In other embodiments, the communication module may be in the form of a wireless communication module, such as, e.g., to a wireless network interface controller, such that the at least one image capturing device and/or the at least one movement mechanism may wirelessly connect to the external processing device through a wireless network (e.g., Wi-Fi (WLAN) communication, RF communication, infrared communication or Bluetooth™).

The system may further include a power source for powering the at least one image capturing device, the at least one movement mechanism of the mount and/or the at least one processor. The power source may include one or more on-board power sources, such as, e.g., one or more batteries. Alternatively, the power source may include one or more connections to a mains power supply.

According to a fifth aspect of the present invention, there is provided a method of fitting spectacles to a subject, said method including:

imaging at least part of a face of the subject wearing the spectacles to generate a 3D model of the at least part of the face of the subject wearing the spectacles; and determining one or more optical measurements of the subject from the 3D model generated, including at least one of the visual axis, the MCOR and the OCR of each eye of the subject.

According to a sixth aspect of the present invention, there is provided a method of fitting spectacles to a subject, said method including:

imaging at least part of the spectacles and at least part of a face of the subject wearing the spectacles to generate 3D models of the at least part of the spectacles imaged and the at least part of the face imaged;

aligning the 3D models generated; and determining one or more optical measurements of the subject from the 3D models once aligned, including at least one of the visual axis, the MCOR and the OCR of each eye of the subject.

According to a seventh aspect of the present invention, there is provided a method of fitting spectacles to a subject, said method including:

associating at least one machine recognisable tag with the spectacles;

imaging at least part of the spectacles and at least part of a face of the subject wearing the spectacles to generate 3D models of the at least part of the spectacles imaged and the at least part of the face imaged;

aligning the 3D models generated based on the at least one machine recognisable tag; and determining one or more optical measurements of the subject from the 3D models once aligned, including at least one of the visual axis, the MCOR and the OCR of each eye of the subject.

The method may include one or more characteristics of the measuring system as hereinbefore described.

The method may or may not include an initial step of removing any lens inserts in the spectacles to be fitted, depending on the type of spectacles. For example, for rimless and partially rimmed spectacles, the lens inserts may not be removed until after the at least part of the spectacles has been imaged, preferably prior to the imaging of the at least part of a face of the subject wearing the spectacles.

In some embodiments, the method may include another initial step of applying a contrast agent to the spectacles prior to imaging.

Likewise, in some embodiments, the method may include another initial step of applying a contrast agent to each of a subject's eyes prior to imaging to at least partially enhance imaging of the subject's eyes. The contrast agent may be any suitable agent capable of staining at least part of each eye, preferably fluoresce. The contrast agent may preferably be water-soluble. The contrast agent may include sodium fluorescein, Rose Bengal or lissamine green, preferably sodium fluorescein, which is capable of fluorescing under cobalt blue illumination.

In some embodiments, the associating of the at least one machine recognisable tag with the spectacles may include adhering the tag to the at least part of the spectacles to be imaged, preferably the frame front.

Typically, the associating may include adhering more than one machine recognisable tag with the spectacles.

In some embodiments, the associating may include adhering at least three machine recognisable tags with the spectacles, typically adhering a first machine recognisable tag and a second machine recognisable tag respectively to a lower outer portion of the left and right frame rims of the spectacles (if present), a third machine recognisable tag may be adhered to a bridge of the spectacles.

In some embodiments, the method may further include tracing the left and right frame rims of the spectacles (if present) with a tracer prior to said imaging. The tracer may be of any suitable form known in the art. For example, in one embodiment, the tracer may include a sensor in the form of a needle which is run along an inside edge of a frame rim to determine the parameters and/or generate a model of the left and right frame rims, preferably the lens groove or v-groove, if present. In another embodiment, the tracer may include a sensor in the form of a rod which is run along an outside edge of lens inserts and/or partial rim if present to determine the parameters and/or generate a model of the spectacle frame. Preferably, the model generated may be a 3D model.

In some embodiments, the imaging may include imaging the at least part of the spectacles. Typically, the imaging may include imaging at least a frame front of the spectacles. Preferably, the imaging may include imaging the frame front of the spectacles and in particular the left and right frame rims, most preferably the lens groove or v-groove, if present. The imaging of the at least part of the spectacles may preferably be carried out with a handheld 3D scanner.

The subject may then wear the spectacles and stand or sit in front of the at least one image capturing device of the present invention for imaging. Typically, the subject may stand or sit in a configuration in which the subject's head is straight, preferably such that subject's head is held in an "orthostatic" position, i.e., a position requiring least effort. More preferably, the subject may stand or sit in a configuration such that the Frankfort plane (PF) associated with the subject's head is substantially horizontal.

The imaging of at least part of a face of the subject wearing the spectacles may preferably include capturing images or video of the subject at more than one orientation, preferably over a range of at least 90°.

The imaging may preferably include imaging of the subject while moving the image capturing device at least partially about, around or across the at least part of a face of the subject.

In some embodiments, the image capturing device may be supported on a mount in front of the subject as previously described. In such embodiments, the image capturing device may be manually or automatically moved via the mount at least partially about, around or across the at least part of a face of the subject.

In other embodiments, the image capturing device may be held by the subject in front of the subject and manually moved at least partially about, around or across the at least part of a face of the subject.

To assist in the determination of the one or more optical measurements, including at least one of the MCOR and the OCR of each eye of the subject, the imaging may further include imaging the at least part of the face of the subject wearing the spectacles while the subject is focusing on objects at different distances or lengths from the subject.

The subject may be imaged while focusing on an object at a first distance. The subject may or may not be imaged while focusing on an object at a second distance. The first and second distances may each be any suitable distance, preferably different distances.

For example, in some embodiments, the first distance may be a distance suitable for determining the subject's optical measurements at a long focal length, such as, e.g., in an infinity focus state or optical infinity. The first distance may be at least 5,000 mm, at least 6,000 mm, at least 7,000 mm, at least 8,000 mm, at least 9,000 mm, at least 10,000 mm, at least 11,000 mm or at least 12,000 mm, preferably at least 6,000 mm. The object may be any suitable item that the subject is able to focus on at the first distance, e.g., the object may be a mirror or a picture.

For example, in some embodiments, the second distance may be a distance suitable for determining the subject's optical measurements at a short focal length. The second distance may be at least 250 mm, at least 300 mm, at least 350 mm, at least 400 mm, at least 450 mm or at least 500 mm. The object may be any suitable item that the subject is able to focus on, e.g., the object may be a tablet, magazine, book or the like.

The subject may be imaged along or nearly along the line of sight or may be imaged while looking down, for example.

Typically, the subject may be imaged along or nearly along the line of sight when focusing on an object at the first distance.

The subject may in some embodiments also be imaged along or nearly along the line of sight when focusing on an object at the second distance. For example, in one embodiment, the subject may manually hold the image capturing device at the second distance. In another embodiment, the subject may focus on an object at the second distance located above, below, beside and/or slightly passed the image capturing device when mounted.

In other embodiments, the subject may be imaged while looking down and focusing on an object at the second distance.

The imaging of the at least part of the face of the subject may be carried out by a 3D scanner or by a stereoscopic system including at least two cameras spaced apart or at least one camera with two spaced apart lenses as previously described. Preferably, the imaging may be carried out by a 3D scanner or a stereoscopic system including at least two, at least three, at least four, at least five or at least six cameras spaced apart.

In some embodiments, the imaging may further include at least partially illuminating the at least part of the face of the subject while imaging, preferably the cornea of each eye of the subject.

In some such embodiments, the at least partial illumination of the cornea of each eye of the subject may be achieved by at least one RGB LED associated with the image capturing device. In preferred such embodiments, the at least partially illuminating may generate one or more corneal reflections that may assist in imaging of the cornea of each eye of the subject. The at least partially illuminating may also cause the contrast agent if applied to fluoresce to thereby enhance imaging of at least the eyes of the subject.

In other such embodiments, the at least partial illumination of the cornea of each eye of the subject may be achieved by at least one IR LED or near IR LED associated with the image capturing device. In preferred such embodiments, the at least partially illuminating may generate one or more corneal reflections that may assist in tracking the subject's point of gaze, line of sight or eye position and/or movement for each eye of the subject over a period of time.

In some embodiments, the imaging may further include imaging the subject while the subject gazes at focal points at or near the edges or extremes of the subject's field of view. Advantageously, the capturing of such images may increase the area of the sclera of each eye imaged and thereby enhance the accuracy of 3D models subsequently generated.

Once imaged, 3D models may be generated of the at least part of the spectacles and/or the at least part of the face of the subject wearing the spectacles.

For imaging carried out by a 3D scanner, 3D models may be generated by any suitable way known in the art. Typically, the 3D models may be generated by a point cloud produced by the 3D scanner.

For imaging carried out by at least two cameras spaced apart, 3D models may be generated by a process of stereo photogrammetry using one or more methods known in the art.

In some embodiments, 3D models of each eye may be generated by mesh segmentation as disclosed in Berard, P, et al. *High-Quality Capture of Eyes*, located at <https://s3-us-west-1.amazonaws.com/disneyresearch/wp-content/uploads/20141203013516/High-Quality-Capture-of-Eyes-Pub-Paper.pdf> and accessed on 24 May 2016 and incorporated by reference in its entirety.

For example, the surface of each eye imaged may be modelled with mesh segments into clusters of about 50 mm$^2$ using k-means and a fit sphere with a 12.5 mm radius (radius of the average eye) to each cluster. Vertices that do not conform with the fit spheres may be pruned until a desired distance threshold and normal threshold are achieved. Multiple iterations of clustering, sphere fitting and pruning may be carried out until convergence is achieved.

Preferably all 3D model generation may be carried out by the at least one processor operably associated with the image capture device of the present invention.

Typically, a 3D model may be generated for imaging carried out at each focal length. For example, a first 3D model of the at least part of the face of the subject may be generated for the subject focusing at the first distance. A second 3D model of the at least part of the face of the subject may be generated for the subject focusing at the second distance.

In embodiments in which a 3D model of the at least part of the spectacles is generated, including of the left and right frame rims of the spectacles generated by the tracer, the 3D model or models of the at least part of the spectacles may be aligned with the 3D model of the at least part of the face of the subject wearing the spectacles. The 3D model of the at least part of the spectacles may be aligned such that the spectacles of the 3D model substantially superimpose over the spectacles from the 3D model of the at least part of the face of the subject wearing the spectacles. The alignment may be carried out automatically or manually by a user manipulating the 3D models. Generally, the alignment is carried out until a good fit is achieved as determined by measuring a root mean square deviation (RMSD) between common points along the spectacles from 3D models being aligned.

Typically, the 3D models may be aligned automatically by the at least one processor. Preferably, the 3D models may be aligned based on the machine recognisable tags. For example, the machine recognisable tags may be identified in each of the 3D models to be aligned and the 3D model or models of the at least part of the spectacles may be superimposed over the spectacles from the 3D model of the at least part of the face of the subject wearing the spectacles such that each machine recognisable tag in the 3D model of the at least part of the spectacles may superimpose over its corresponding position in the spectacles from the 3D model of the at least part of the face of the subject wearing the spectacles.

Similarly, the 3D models may be aligned based at least partly on the plane formed by triangulation of the at least three machine recognisable tags in the 3D model or models of the at least part of the spectacles and the 3D model of the at least part of the face of the subject wearing the spectacle.

In embodiments in which further imaging of the eye is captured while the subject gazes at focal points at or near the edges or extremes of the subject's field of vision, the 3D models subsequently generated may be aligned relative to and at least partially integrated with the 3D models generated of the subject focusing at the first and the second distances. Typically, 3D models of the sclera only will be integrated with the 3D models generated of the subject focusing at the first and the second distances. Preferably, the 3D models of the sclera may be aligned relative to one another and averaged prior to being integrated with the 3D models generated of the subject focusing at the first and the second distances. The 3D models of the sclera may be aligned relative to one another by a common feature, such as, e.g., the location of the pupil.

In embodiments in which further imaging of the eye tracks the subject's point of gaze, line of sight or eye position and/or movement for each eye over a period of time, the 3D models subsequently generated may be aligned relative to one another by a common feature, such as, e.g., the location or position of the pupil, the position of which has been tracked and determined.

Once the 3D models are generated and in some embodiments aligned, the MCOR of each eye of the subject may be determined.

The MCOR of each eye of the subject may be determined by any suitable means. Preferably, the MCOR of each eye of the subject may be determined from the 3D model of the subject focusing at the first distance.

For example, in one embodiment the MCOR of each eye may be determined by modelling a sphere or ellipsoid over the sclera of the eye of the subject in a 3D model and determining the centre point of each sphere or ellipsoid.

Preferably, the 3D model used may be an averaged and integrated 3D model as described above. Advantageously, by using the averaged and integrated 3D model, the sphere or ellipsoid can be more accurately modelled.

More preferably, more than one sphere or ellipsoid may be modelled over the sclera of each eye of the subject in the averaged and integrated 3D model. The centre point of each sphere or ellipsoid modelled may then be determined and the position of the centre points averaged to determine an average centre point corresponding to the MCOR.

Typically, multiple iterations of MCOR determination may be carried out until convergence is achieved.

In some embodiments, the modelling of one or more spheres or ellipsoids over the sclera of the eye of the subject in the 3D model may be manually undertaken. In other embodiments, the modelling may be automatically carried out along with centre point determination and/or averaging.

The OCR of each eye may then be derived from the MCOR.

For example, in some embodiments, the OCR of each eye may be determined by locating or determining the visual axis of each eye and then determining the shortest distance from the MCOR to the visual axis to thereby determine the OCR, preferably from the 3D model of the subject focusing at the first distance and when looking down the line of sight.

In one embodiment, the visual axis may be determined from the 3D model of the subject focusing at the first distance and when looking down the line of sight. The visual axis may then be determined as an imaginary line extending along the line of sight through the centre of the pupil to a rear surface of the eye, preferably the fovea centralis. In the 3D model of the subject focusing at the first distance, the visual axis may be substantially parallel with the PF. In one such embodiment, the determining of the visual axis may be assisted by capturing a first Purkinje image of the subject's eye and extending the imaginary line through the first Purkinje image and the centre of the pupil to the rear of the eye, preferably the fovea centralis.

The first Purkinje image of each may be captured by at least partially illuminating the cornea of each eye of the subject when imaging the at least part of the face of the subject. The first Purkinje image may be the brightest reflection.

The pupil of each eye may be identified by any suitable means. For example, in one embodiment, the pupil of each eye may be identified by user analysis of the 3D model or models once aligned. The user may then model a circle over the pupil, the centre point of which represents the centre of the pupil. In another embodiment, the pupil of each eye may be automatically detected and have a circle modelled over the detected pupil. Again, the centre point of the circle represents the centre of the pupil.

A person skilled in the art will understand that the OCR and the visual axis differ with the direction of gaze of each eye. Accordingly, the OCR and the visual axis determined from the 3D model of the subject focusing at the first distance and when looking down the line of sight will likely differ from the 3D model of the subject focusing at the second distance and when looking down the line of sight.

In embodiments in which a 3D model is generated of the subject focusing at an object at the second distance and looking down the line of sight, the MCOR, OCR and the visual axis may be determined as described above. Conversely, the OCR and the visual axis may be determined by positional information derived from gaze tracking as described above.

In embodiments in which a 3D model is generated of the subject looking down at an object at the second distance, the MCOR may still be determined as described above. However, the visual axis may be determined by: (1) aligning each eye of the subject from the 3D model of the subject focusing at the first distance over the 3D model of the subject focusing at the second distance; and (2) extrapolating the position of the visual axis in the 3D model of the subject looking down at an object at the second distance from the position of the visual axis in the aligned eye from the 3D model of the subject focusing at the first distance. The OCR may then be determined as described above. Conversely, again the OCR and the visual axis may be determined by positional information derived from gaze tracking as described above.

As indicated, the method may include the determination of other optical measurements. For example, the method may further include determining at least one of monocular pupillary distance (PD), pupil height (PH), back vertex distance (BVD), optical centre of rotation distance (OCRD), pupillary axis, pantoscopic tilt, frame wrap and head cape.

In one embodiment, the monocular PD of the subject may be determined by measuring a horizontal distance in the 3D model from a centre of the pupil of each eye to the vertical line of symmetry extending through the bridge of the spectacles. In another embodiment, the monocular PD of the subject may be determined by measuring a horizontal distance in the 3D model from the visual axis of each eye to the vertical line of symmetry extending through the bridge of the spectacles.

The distance measured in the 3D model may be the actual distance or may need to be multiplied by a scaling factor to obtain the actual distance. In some embodiments, the monocular PD of the subject may be determined from separate 3D models of the subject focusing at the first distance and the second distance. Advantageously, this may allow both near and distant monocular PDs of the subject to be determined.

In one embodiment, the PH of the subject may be determined by measuring a vertical distance in the 3D model from a centre of the pupil of each eye to a lowermost inside frame edge of the spectacles (i.e., for fully rimmed spectacles) or lowermost outside frame edge of the spectacles (i.e., for rimless or partially rimmed spectacles). In another embodiment, the PH of the subject may be determined by measuring a vertical distance in the 3D model from the visual axis of each eye to a lowermost inside frame edge of the spectacles (i.e., for fully rimmed spectacles) or lowermost outside frame edge of the spectacles (i.e., for rimless or partially rimmed spectacles).

The distance measured in the 3D model may be the actual distance or may need to be multiplied by a scaling factor to obtain the actual distance. In some embodiments, the PH of the subject may be determined from separate 3D models of the subject focusing at the first distance and the second distance. Advantageously, this may allow both near and distant PH of the subject to be determined.

The vertex distance or BVD may be determined by measuring a shortest distance in the 3D model between the apex of the cornea of each eye and a plane corresponding to the back vertex of the lenses in the spectacles. In some embodiments, this may further require input of the bevel position of the lenses, the spectacle lens prescription and the centre of thickness and sag of the back curve of the lens. Again, the distance measured in the 3D model may be the actual distance or may need to be multiplied by a scaling factor to obtain the actual distance. Preferably, the vertex distance or BVD may be determined from the 3D model of the subject focussing at a long focal length, such as, e.g., in an infinity focus state or optical infinity, i.e., the first distance, or from a 3D model of the subject looking down the line of sight.

The OCRD corresponds to the distance from the OCR of each eye to the back vertex of the lens. The OCRD may be determined by measuring a shortest distance in the 3D model from the OCR of each eye to a plane corresponding to the back vertex of the lenses in the spectacles. As with the BVD described above, in some embodiments, this may further require input of the bevel position of the lenses, the spectacle lens prescription and the centre of thickness and sag of the back curve of the lens. The distance measured in the 3D model may be the actual distance or may need to be multiplied by a scaling factor to obtain the actual distance. Preferably, the OCRD may be determined from the 3D model of the subject focussing at a long focal length, such as, e.g., in an infinity focus state or optical infinity, i.e., the first distance, or from a 3D model of the subject looking down the line of sight.

In some embodiments, the pupillary axis of each eye may be determined by determining the apex of the cornea from the 3D model of the subject when looking down the line of sight. The pupillary axis may then be determined as an imaginary horizontal line axially extending through the apex of the cornea to a rear surface of the eye.

The apex of the cornea of each eye may be determined by modelling spheres over the sclera and cornea of each eye of the subject in the 3D model and identifying the greatest distance extending outwardly from the circumference of the sphere modelled over the sclera to the circumference of the sphere modelled over the cornea. The point at which a line extending along the greatest distance crosses the circumference of the sphere modelled over the cornea may substantially correspond with the apex of the cornea.

In other embodiments, the pupillary axis of each eye may be determined by locating a pupil of each eye and determining a centre point of each pupil from the 3D model of the subject when looking down the line of sight. The pupillary axis may then be determined as an imaginary line extending through the centre point of the pupil of each eye to a rear surface of the eye.

The pupil of each eye and the centre of each pupil may be identified as described above.

The pantoscopic tilt may be determined by measuring in the 3D model the angle between a plane corresponding to the frame front of the spectacles and a vertical plane extending perpendicular to the visual axis. As with the determining of the vertex distance or BVD or the OCRD, the pantoscopic tilt may be determined from the 3D model of the subject wearing the spectacles and focussing at a long focal length, such as, e.g., in an infinity focus state or optical infinity, i.e., the first distance, or from a 3D model of the subject looking down the line of sight.

The frame wrap or face-form wrap of the spectacles may be determined by measuring in the 3D model the angle between a plane corresponding to each of the left and right frame rims of the frame front of the spectacles and a vertical plane extending perpendicular to the visual axis. As with the determining of the vertex distance or BVD, the OCRD and the pantoscopic tilt, the frame wrap or face-form wrap may be determined from the 3D model of the subject wearing the spectacles and focussing at a long focal length, such as, e.g., in an infinity focus state or optical infinity, i.e., the first distance, or from a 3D model of the subject looking down the line of sight.

The head cape of a subject may be determined by measuring in the 3D model the horizontal angle of head turn or orientation of the head of the subject or part thereof relative to a direction of sight or gaze of the subject when the subject is standing or seated in a configuration such that the Frankfort plane (PF) associated with the subject's head is substantially horizontal. As with other measurements, the head cape may be determined from a 3D model of the subject looking down the line of sight.

In some embodiments, the method may further include characterising a profile shape of the lens groove or v-groove of the left and right frame rims of the spectacles. The profile shape may be characterised from the 3D model of the at least part of the spectacles or the at least part of the face of the subject wearing the spectacles, preferably the former. Advantageously, accurately characterising the profile shape of the lens groove or v-groove of the left and right frame rims of the spectacles may assist in the edging and fitting of prescription lenses by allowing the lenses to be edged to complementarily fit the corresponding lens groove or v-groove of the spectacles.

In some embodiments, the method may further include transmitting measurements of the subject and the spectacles to a lens manufacturer.

According to an eighth aspect of the present invention, there is provided a method of fitting a scleral contact lens to a subject, said method including:

imaging at least an eye region of the subject to generate a 3D model of the at least an eye region of the subject; and determining a scleral curvature of a portion of an eye of the subject from the 3D model generated.

The method may include one or more characteristics of the system and/or method as hereinbefore described.

The subject may preferably remove spectacles and stand or sit in front of the at least one image capturing device of the present invention for imaging. Typically, the subject may stand or sit in a configuration in which the subject's head is straight, preferably such that subject's head is held in an "orthostatic" position, i.e., a position requiring least effort. More preferably, the subject may stand or sit in a configuration such that the Frankfort plane (PF) associated with the subject's head is substantially horizontal.

The imaging of the at least an eye region of the subject may be carried out by a 3D scanner or by a stereoscopic system including at least two cameras spaced apart or at least one camera with two spaced apart lenses as previously described.

In some embodiments, the imaging may further include imaging the subject while the subject gazes at focal points at or near the edges or extremes of the subject's field of view to better visualise the sclera of each eye of the subject.

Once imaged, 3D models may be generated of the at least an eye region of the subject. The 3D model or models may be generated as described above.

Preferably, the method may include determining the scleral curvature of a portion of the sclera extending around a periphery of the cornea of the eye.

Advantageously, the determination of the scleral curvature of the eye may greatly assist in the design and fitting of scleral contact lenses by allowing the base curvature of the lenses to be accurately matched to the scleral curvature of the eye of the subject.

According to a ninth aspect of the present invention, there is provided a method of fitting an intra-ocular lens (IOL) to a subject, said method including:

imaging at least an eye region of the subject to generate a 3D model of the at least an eye region of the subject;

determining at least an optical centre of rotation (OCR) of an eye of the subject from the 3D model generated; and determining the optimal optical power of the intra-ocular lens to be fitted to the subject based at least on the OCR determined.

The method may include one or more characteristics of the system and/or method as hereinbefore described.

The subject may preferably remove spectacles and stand or sit in front of the at least one image capturing device of the present invention for imaging. Typically, the subject may stand or sit in a configuration in which the subject's head is straight, preferably such that subject's head is held in an "orthostatic" position, i.e., a position requiring least effort. More preferably, the subject may stand or sit in a configuration such that the Frankfort plane (PF) associated with the subject's head is substantially horizontal.

The imaging of the at least an eye region of the subject may be carried out by a 3D scanner or by a stereoscopic system including at least two cameras spaced apart or at least one camera with two spaced apart lenses as previously described.

In some embodiments, the imaging may further include imaging the subject while the subject gazes at focal points at or near the edges or extremes of the subject's field of view to better visualise the sclera of each eye of the subject.

Once imaged, 3D models may be generated of the at least an eye region of the subject. The 3D model or models may be generated as described above.

Preferably, the method includes determining at least the OCR of an eye of the subject. The OCR may be determined from the 3D model generated as previously described. In some embodiments, the corneal curvature of an eye of the subject may also be determined from the 3D model generated.

The method also preferably includes determining an optimal optical power of the IOL to be fitted to the subject. An optimal optical power will be understood to mean an optimal amount of refractive power that provides the subject with the best optical outcome or eliminates or minimizes refractive error.

Advantageously, the determination of the OCR of the eye may greatly assist in the determining the optimal optical power for the IOL to be fitted to the subject as it enhances the accuracy of the optical power determined.

According to a tenth aspect of the present invention, there is provided a method of diagnosing and/or monitoring ocular diseases and/or disorders in a subject, said method including:

imaging at least an eye region of the subject to generate a 3D model of the at least an eye region of the subject; and diagnosing and/or monitoring an ocular disease and/or disorder of the subject from the 3D model generated.

The method may include one or more characteristics of the system and/or method as hereinbefore described.

The method may be used to diagnose and/or monitor ocular diseases such as, e.g., an ocular surface lesion, an ocular surface neoplasia, a conjunctival and corneal intraepithelial neoplasia (CIN), a squamous cell carcinoma (SSCA), a melanocytic tumor (ocular melanosis/melanoma), a conjunctival lymphoma, pterygium, pinguecula, a corneal ulcer, an eyelid lesion, chalazion, hordoleum, a dermal naevus, a seborrhoeic keratosis and/or a sudoriferous cyst.

Likewise, the method may be used to diagnose and/or monitor ocular disorders, such as, e.g., dry eye syndrome and Stevens-Johnson syndrome.

In some embodiments, the method may include an initial step of applying a contrasting agent as described above to the subject's eye to at least partially enhance the imaging of the ocular disease or disorder.

The subject may preferably remove spectacles and stand or sit in front of the at least one image capturing device of the present invention for imaging. Typically, the subject may stand or sit in a configuration in which the subject's head is straight, preferably such that subject's head is held in an "orthostatic" position, i.e., a position requiring least effort. More preferably, the subject may stand or sit in a configuration such that the Frankfort plane (PF) associated with the subject's head is substantially horizontal.

The imaging of the at least an eye region of the subject may be carried out by a 3D scanner (or a near IR interferometer) or by a stereoscopic system including at least two cameras spaced apart or at least one camera with two spaced apart lenses as previously described.

In some embodiments, the imaging may further include at least partially illuminating the at least an eye region of the subject while imaging. The at least partial illumination may be achieved by at least one RGB LED associated with the image capturing device. In preferred embodiments, the at least partially illuminating may cause the contrasting agent to fluoresce thereby enhancing the imaging of the ocular disease or disorder.

In some embodiments, the imaging may further include imaging the subject while the subject gazes at focal points at or near the edges or extremes of the subject's field of view to better visualise the ocular disease or disorder.

Once imaged, 3D models may be generated of the at least an eye region of the subject. The 3D model or models may be generated as described above.

The 3D model or models may then be visually inspected to diagnose and/or monitor the ocular disease or disorder.

For example, said monitoring may include visual inspecting a periphery of the ocular disease and/or disorder to determine whether the ocular disease and/or disorder has increased or decreased in size or changed in appearance. An increase in size may be indicative that a current therapy is not working effectively in treating the ocular disease and/or disorder. Conversely, a decrease in size may be indicative that the current therapy is working effectively.

In some embodiments, said monitoring may include comparing the ocular disease and/or disorder in the 3D model generated with an earlier 3D model of the ocular disease and/or disorder to determine whether there has been a change in size or visual appearance of the ocular disease and/or disorder, for example.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1:
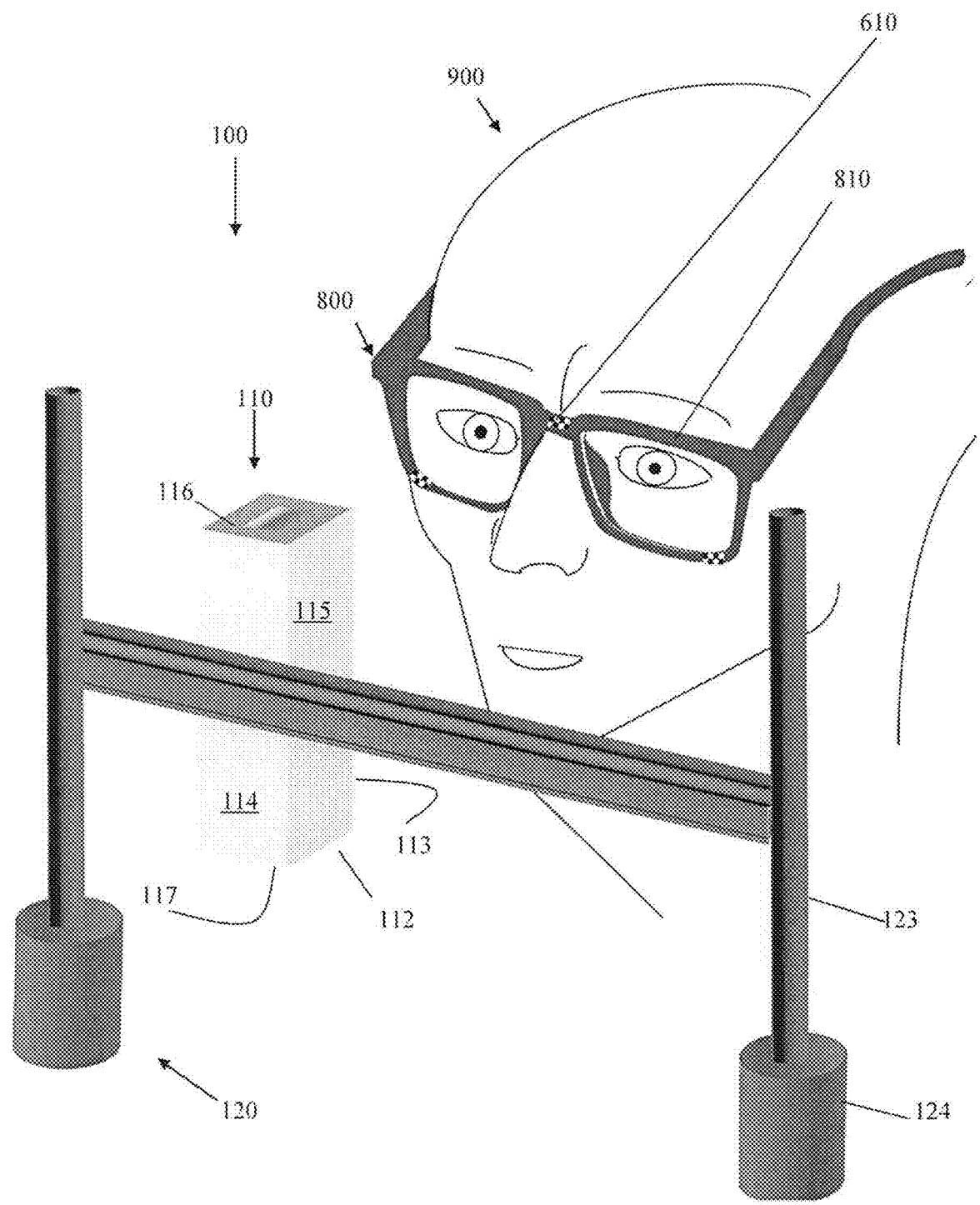
FIG. 1 is an illustration of an optical measuring system according to an embodiment of the present invention positioned in front of a face of a subject.
Figure 2:
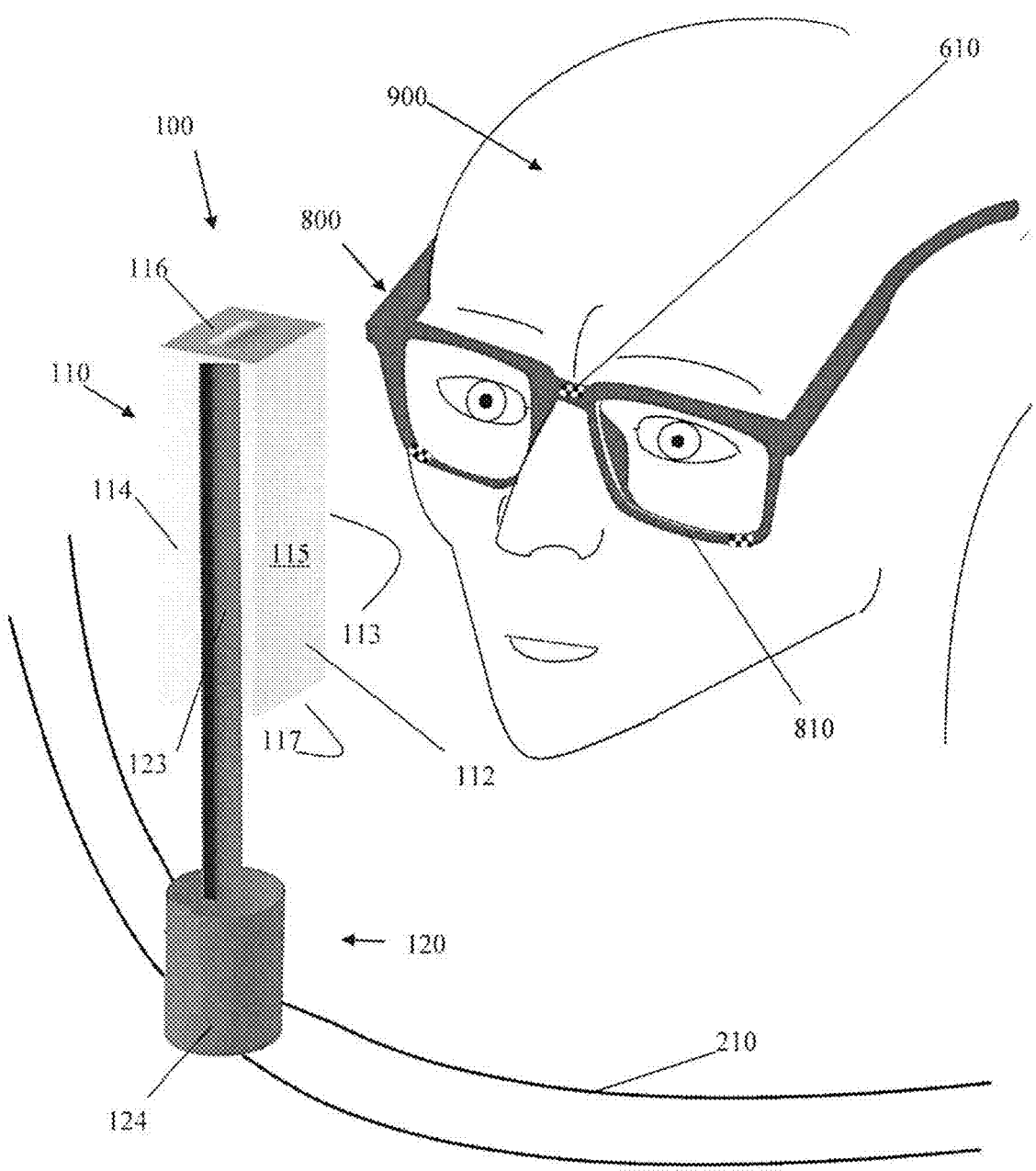
FIG. 2 is an illustration of an optical measuring system according to another embodiment of the present invention positioned in front of a face of a subject.
Figure 3:
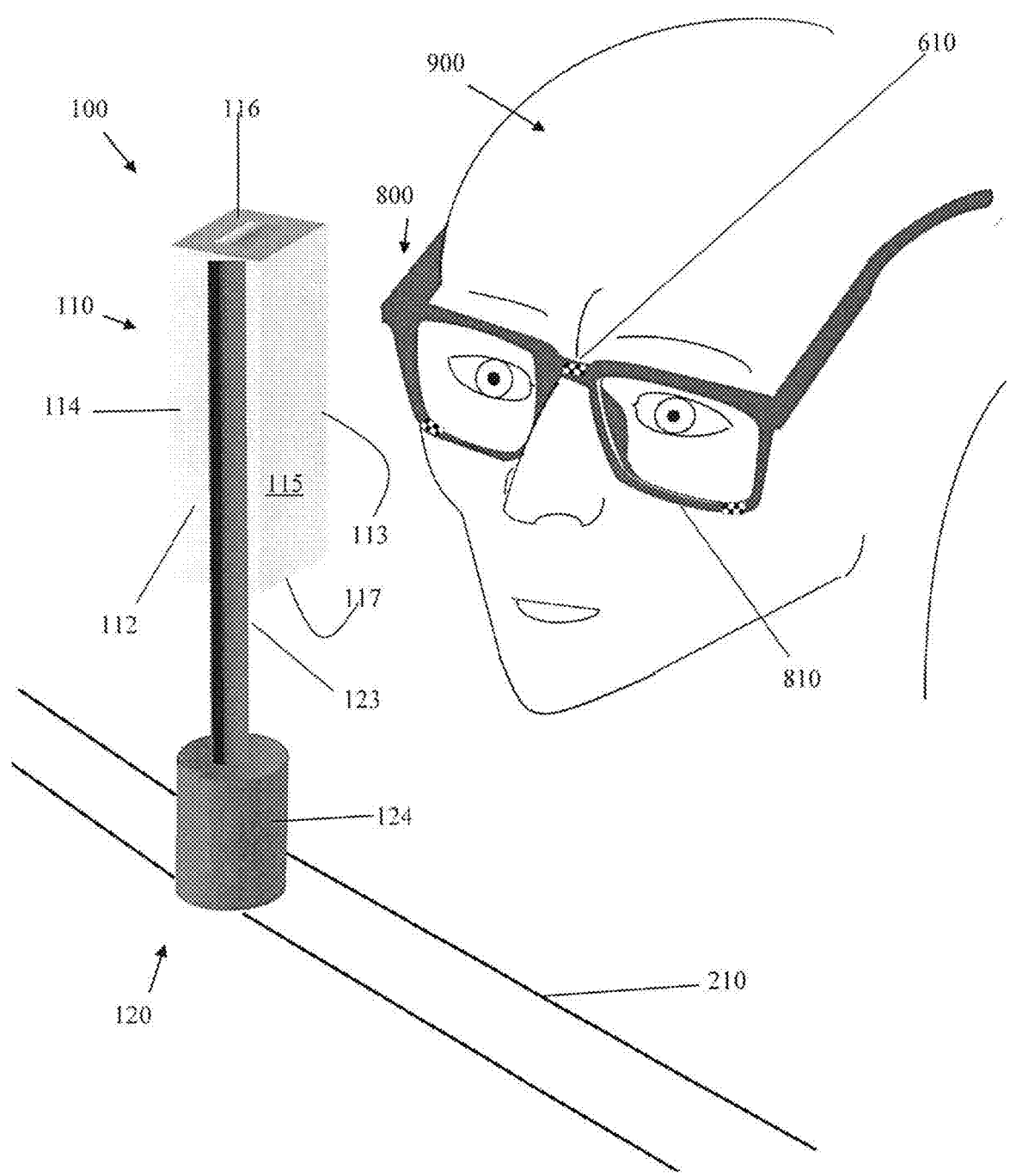
FIG. 3 is an illustration of an optical measuring system according to yet another embodiment of the present invention positioned in front of a face of a subject.
Figure 4:
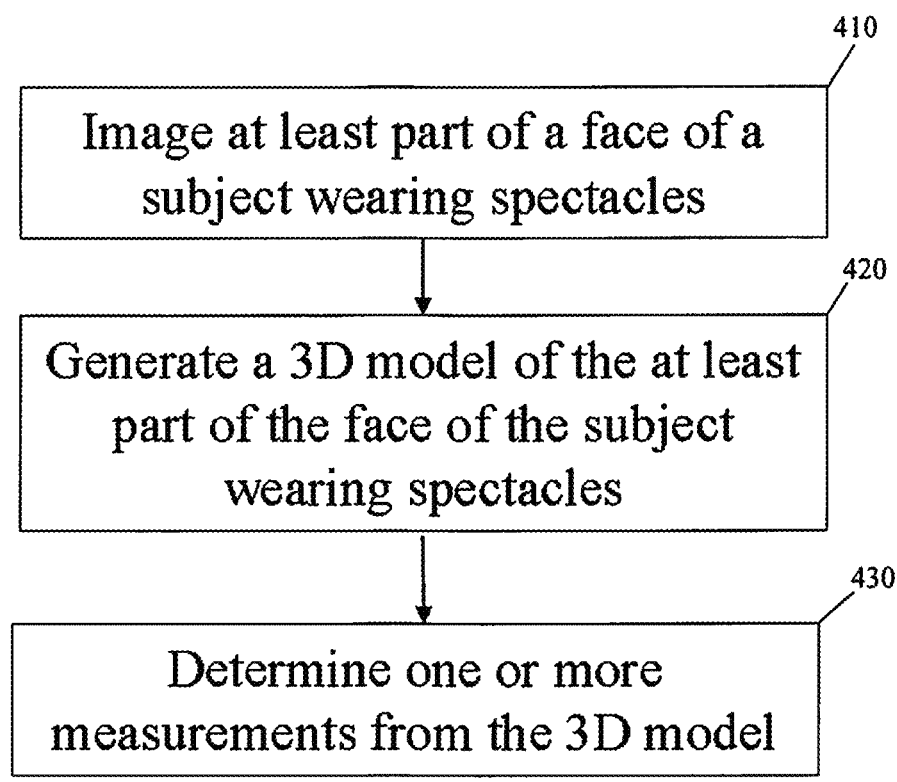
FIG. 4 is a flow chart showing steps in a method of fitting spectacles to a subject using the optical measuring system as shown in FIGS. 1 to 3 according to an embodiment of the present invention.
Figure 5:
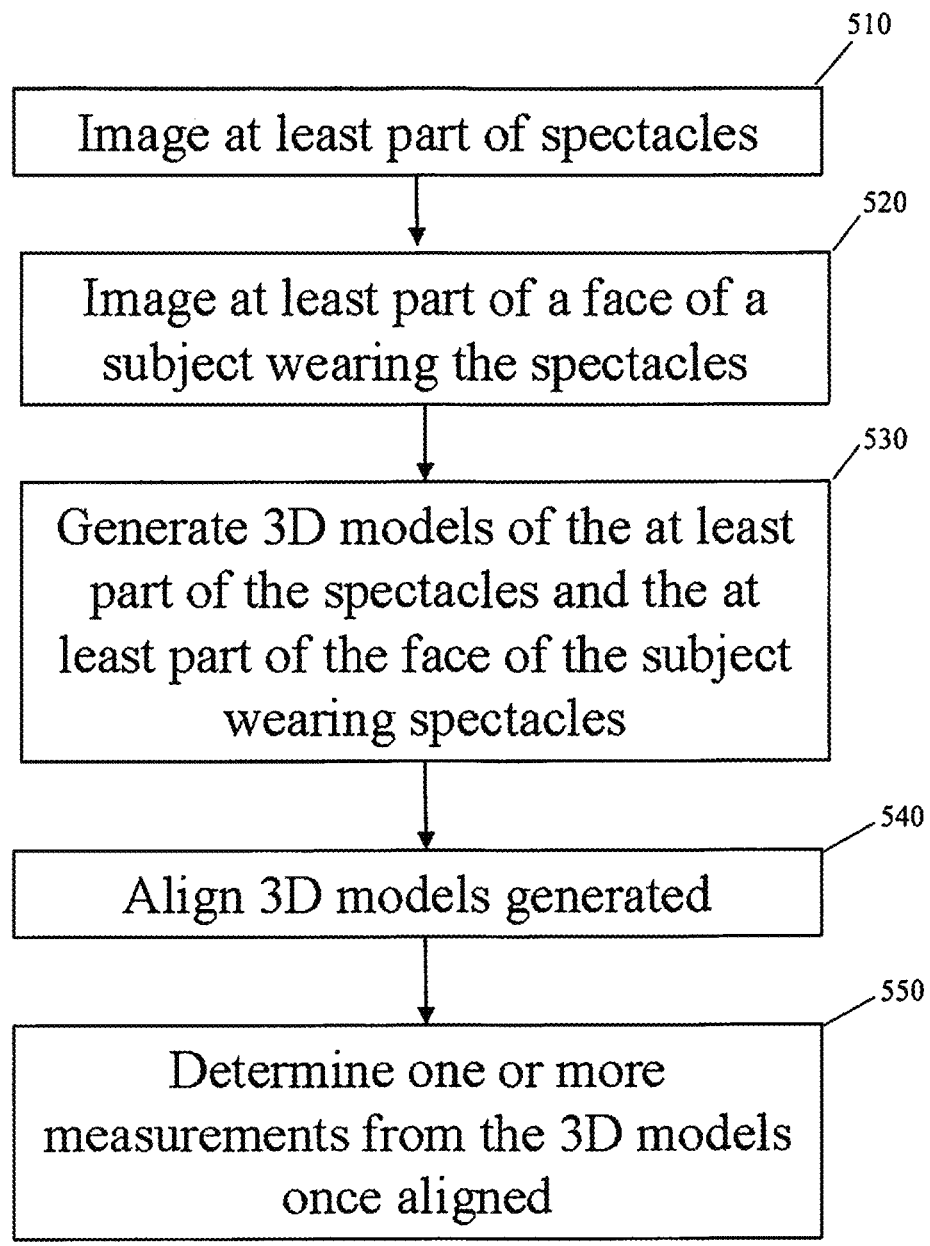
FIG. 5 is a flow chart showing steps in a method of fitting spectacles to a subject using the optical measuring system as shown in FIGS. 1 to 3 according to another embodiment of the present invention.
Figure 6:
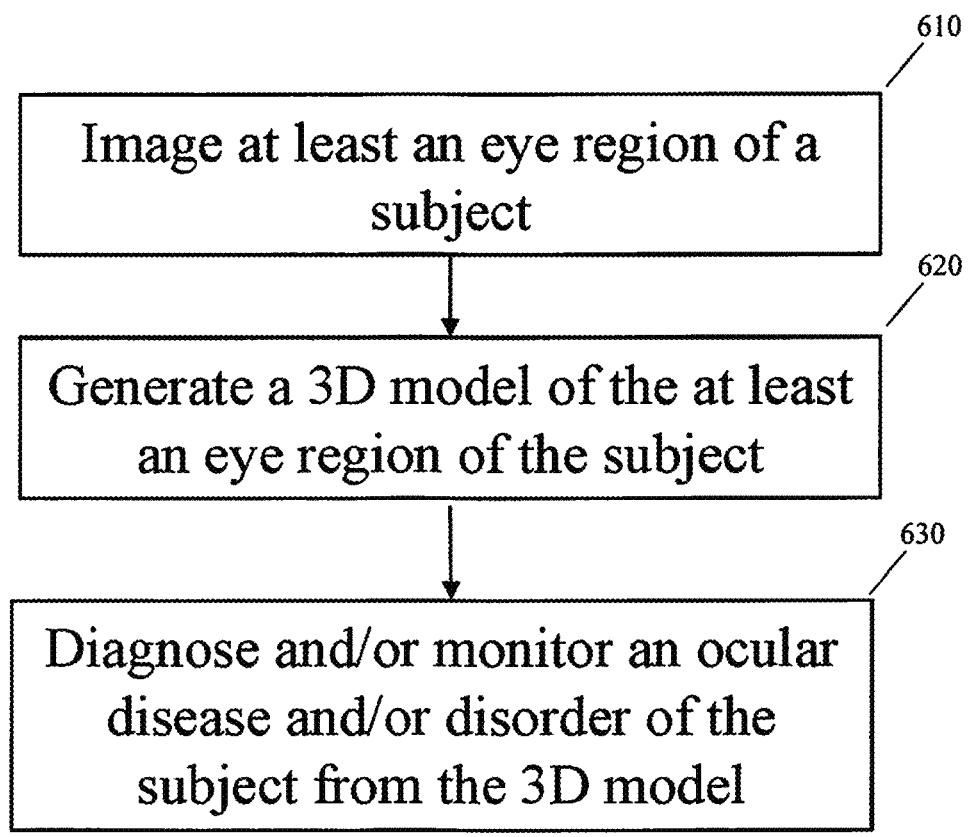
FIG. 6 is a flow chart showing steps in a method of diagnosing and/or monitoring ocular diseases and/or disorders in a subject using the optical measuring system as shown in FIGS. 1 to 3 according to an embodiment of the present invention.

FIGS. 1 to 3 show an optical measuring system (100) according to various embodiments of the present invention for fitting spectacles (800) to a subject (900) and/or for diagnosing and/or monitoring ocular diseases and/or disorders in the subject (900).

The optical measuring system (100) includes an image capturing device (110), a mount (120) for mounting the image capturing device (110) in front of the subject (900) wearing the spectacles (800) and moving the image capturing device (110) relative to the subject (900) and at least one processor in the form of a computer (not shown) for determining: the mechanical centre of rotation (MCOR) of each eye, the optical centre of rotation (OCR) of each eye, the visual axis of each eye and the monocular pupillary distance (PD) of the subject (900); a pupil height (PH) of the subject (900) relative to the spectacles (800); and a back vertex distance (BVD), optical centre of rotation distance (OCRD), pantoscopic tilt and frame wrap of the spectacles (800) relative to the subject (900).

The image capturing device (110) is capable of capturing at least one image of at least a part of a face of the subject (900) wearing the spectacles (800) for generating a three dimensional (3D) model of at least the part of the face of the subject (900) wearing the spectacles (800).

The image capturing device (110) is also capable of capturing at least one image of at least a frame front (810) of the spectacles (800) for generating a 3D model of at least the frame front (810) of the spectacles (800).

The image capturing device includes a body (112) having a substantially rectangular shape. The body (112) has a subject-facing surface (113), an opposed outward facing surface (114), opposed side edges (115), an upper edge (116) and a lower surface (117).

The image capturing device (110) includes at least one sensor in the form of a camera or a detector, such as, e.g., a charge-coupled device or positron sensitive device, and, depending on the type of image capturing device, may include at least one emitter for emitting radiation in the form of visible light, infrared, near infrared or X-ray or soundwaves in the form of ultrasound.

For example, if the image capturing device (110) is a 3D scanner, the device (110) could include at least one sensor in the form of a detector and at least one emitter for emitting visible radiation. The image capturing device (110) could also include at least one camera.

If, however, the image capturing device (110) is stereoscopic camera system, the device (110) will include at least two cameras spaced apart from one another.

The at least one sensor and the at least one emitter, if present, are located on the subject-facing surface (113) of the body (112) of the image capturing device (110). If present, the emitter will include an array of RGB LEDs.

The image capturing device (110) is detachably mounted to the mount (120) via the outward facing surface (114) of the body (112) of the device (110).

The mount (120) is located or positioned in front of the subject at a distance of between about 500 mm and about 1,125 mm from the subject.

The mount (120) is configured to move the image capturing device (110) laterally or sideways relative to the subject (900) to allow imaging over a range of at least 90° of the at least part of the subject's face. The mount (120) is also configured to move the image capturing device (110) vertically relative to the subject (900).

The mount (120) includes at least one elongate support member (123), a mounting portion (122; not visible) associated with the at least one elongate support member (123) and a base (124) extending from a lower end portion of the at least one elongate support member (123).

The base (124) is configured to rest on a support surface (such as, e.g., a floor, desk or table) and hold the at least one elongate support member (123) in a substantially vertical position. In some embodiments, the base (124) includes a movement mechanism allowing the base (124) to move along the support surface. This will be described further below.

The mounting portion (122; not visible) is substantially flat and includes a device abutting surface configured to be releasably fastened to the outward facing surface (114) of the body (112) of the device (110). The device (110) is releasably fastened to the mounting portion (122; not visible) with one or more snap fasteners and/or with an adhesive (e.g., double-sided adhesive tape).

The mount (120) will now be further described with reference to FIGS. 1 to 3, which each show different embodiments of the mount (120).

Referring to FIG. 1, in this embodiment the mount (120) includes two elongate members (123) spaced apart from one another in a lateral direction in front of the subject (900). Each elongate support member (123) extends in a substantially vertical direction from a base (124) as described above. A rail (125) extends between and is movably coupled to the elongate members (123) such that it is able to be slid in a vertical direction relative to the elongate members (123). The mounting portion (122; not visible) is, in turn, movably coupled to the rail (125) such that the mounting portion (122; not visible) and the attached image capturing device (110) are able to be slid in a horizontal direction relative to the rail (125).

Each of the elongate members (123) in this embodiment includes a female formation in the form of an elongate channel or groove extending at least partially along a longitudinal height of the elongate members (123).

The rail (125) includes a male formation in the form of a retaining member having an enlarged head or other type of retaining end at each longitudinal end of the rail (125).

In use, the enlarged head or other type of retaining end of each retaining member is configured to engage and be retained within the elongate channel or groove and be slideable relative to the elongate channel or groove.

Similarly, the rail (125) and the mounting portion (122; not visible) respectively include a female formation in the form of an elongate channel or groove and a male formation in the form of a retaining member having an enlarged head or other type of retaining end to allow the mounting portion (122; not visible) to be slideable relative to the rail (125).

The rail (125) and the mounting portion (122; not visible) and attached image capturing device (110) can either be manually moved or can be moved by one or more servomechanisms operatively associated with each of the rail (125) and the mounting portion (122; not visible).

Turning to FIG. 2, in this embodiment the mount (120) includes a single elongate support member (123), a mounting portion (122; not visible) as described above extending from an upper end portion of the elongate support member (123) and a base (124) as described above extending from an opposed lower end portion of the elongate support member (123).

The elongate support member (123) in this embodiment includes two or more telescopic member capable of being moved between an extended position and a retracted position to adjust the height of the image capturing device (110) relative to the subject (900). The telescopic members are driven between the extended position and the retracted position by a linear actuator powered by an electric motor.

The base (124) of the mount (120) in this embodiment includes wheels or rollers located on an underside of the base (124). The wheels or rollers move the mount (120) and the attached image capturing device (110) along tracks (210) extending along the support surface.

As shown, the tracks (210) extend in a curve or arc about a front of the subject (900) allowing the mount (120) and the attached image capturing device (110) to be moved about a front of the subject (900) over a range of at least 120°.

The wheels or rollers located on the underside of the base (124) can be manually moved or can be driven by one or more electric motors.

Turning now to FIG. 3, in this embodiment, the mount (120) is the same as the mount (120) as shown in FIG. 2 save that the tracks (210) in this embodiment extend in a lateral direction in front of the subject (900).

A method (400) of using the optical measuring system (100) is now described in detail with reference to FIGS. 1 to 3, 7 and 8.

The method (400) optionally includes an initial step of removing any lens inserts in the spectacles (800) to be fitted.

The method (400) optionally includes another initial step of applying a contrast agent to the spectacles (800) prior to imaging.

The method (400) optionally further includes another initial step of tracing the left and right frame rims of the spectacles (800) with a tracer prior to imaging.

At step 410, the image capturing device (110) is used to image at least part of the face of the subject (900) wearing the spectacles (800). The imaging includes capturing a plurality of images of the at least part of the face of the subject (900) wearing the spectacles (800) over a horizontal range of at least 90° of the at least part of the face of the subject (900) wearing the spectacles (800). This is achieved by using the mount (120) to move the image capturing device (110) in a lateral direction at least partially about, around or across the at least part of the face of the subject (900) wearing the spectacles (800).

The imaging includes first imaging the at least part of the face of the subject (900) wearing the spectacles (800) while the subject (900) focuses on a first object 6 m away from the subject (900). The subject (900) is imaged down the line of sight.

The imaging may optionally include a second imaging of the at least part of the face of the subject (900) wearing the spectacles (800) while the subject (900) focuses on a second object 400 mm away from the subject (900). The subject (900) is imaged while looking down at the second object.

For all imaging, the subject (900) is to be in a natural posture. For the first imaging, the subject (900) holds his or her head in an "orthostatic" position in which the Frankfort plane (PF) associated with the head of the subject (900) is substantially horizontal.

Figure 7:
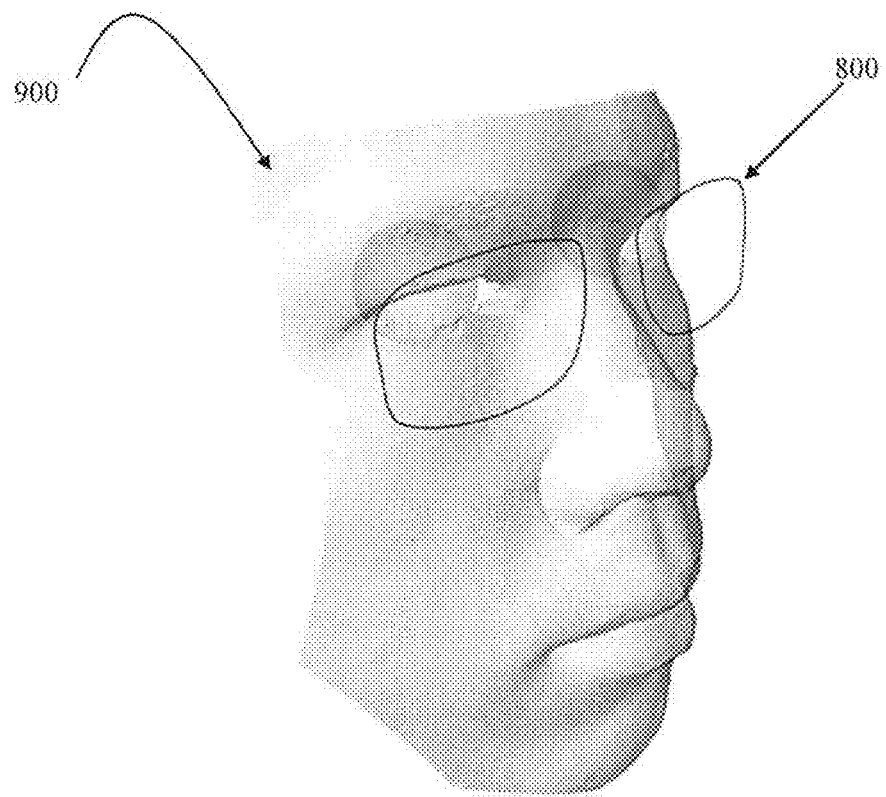
FIG. 7 is a screen capture of a 3D model of part of a subject's face wearing spectacles generated by the system as shown in any one of FIGS. 1 to 3.

At step 420 and with reference to FIG. 7, 3D models of the at least part of the face of the subject (900) wearing the spectacles (800) are generated based on the images captured. The 3D models are generated by the computer operatively connected to the image capturing device (110).

A first 3D model of the at least part of the face of the subject (900) wearing the spectacles (800) is generated from the first imaging.

A second 3D model of the at least part of the face of the subject (900) wearing the spectacles (800) can optionally be generated from the second imaging, if captured.

If the image capturing device (110) is in the form of a 3D scanner, the 3D models will be generated from a point cloud produced by the 3D scanner.

If the image capturing device (110) is in the form of a stereoscopic camera system, the 3D models will be generated by a process of stereo photogrammetry.

At step 430, one or more optical measurements, including MCOR of each eye, OCR of each eye, visual axis of each eye, monocular PD, PH, BVD, OCRD, pantoscopic tilt, and/or frame wrap or face-form wrap and head cape of the subject (900) are determined from the 3D models generated.

First, the MCOR of each eye of the subject (900) is determined from the 3D models. The MCOR is determined by modelling a sphere or ellipsoid over the sclera of each eye of the subject (900) in each 3D model and determining a centre point of the sphere or ellipsoid.

In some embodiments, multiple spheres or ellipsoids can be modelled over the sclera of each eye of the subject (900). The centre point of each sphere or ellipsoid modelled can then be determined and the position of the centre points averaged to determine an average centre point corresponding to the MCOR.

Typically, multiple iterations of MCOR determination may be carried out until convergence is achieved.

The OCR of each eye can then be derived from the MCOR of each eye together with the visual axis. The OCR is determined by locating or determining the visual axis of each eye and determining the shortest distance from the MCOR to the visual axis in the first 3D model.

The visual axis for each eye of the subject (900) is determined from the first 3D model. The visual axis is determined by axially extending an imaginary line along the line of sight through the centre of the pupil to a rear surface of the eye.

The centre of the pupil of each eye can be determined by user analysis of the 3D model. The user can then model a circle over the pupil, the centre point of which represents the centre of the pupil. Alternatively, the pupil of each eye can be automatically detected and have a circle modelled over the detected pupil. Again, the centre point of the circle represents the centre of the pupil.

The pupillary axis of each eye of the subject (900) is determined from the first 3D model. The pupillary axis is located by determining the apex of the cornea of each eye. The pupillary axis can then be determined as an imaginary horizontal line axially extending through the apex of the cornea to a rear surface of each eye.

The apex of the cornea of each eye can be determined by modelling spheres over the sclera and cornea of each eye of the subject in the 3D model and then identifying the greatest distance extending outwardly from a circumference of the sphere modelled over the sclera to a circumference of the sphere modelled over the cornea. The point at which a line extending along the greatest distance crosses the circumference of the sphere modelled over the cornea substantially corresponds with the apex of the cornea.

As the OCR, the visual axis and the pupillary axis differ with the direction of the gaze, the OCR, visual axis and pupillary axis also need to be determined for the second 3D model.

For the second 3D model, the visual axis and/or the pupillary axis are determined by: (1) aligning each eye of the subject from the first 3D over the second 3D model; and (2) extrapolating the position of the visual axis and/or the pupillary axis in the second 3D model from the position of the visual axis and/or pupillary axis in the aligned eye from the first 3D model. The OCR may then be determined as described above.

The monocular PD of the subject (900) is determined by measuring a horizontal distance in each 3D model from a centre of the pupil of each eye to the vertical line of symmetry extending through the bridge of the spectacles in one embodiment. The pupil of each eye is automatically detected from each 3D model and is modelled with a circle fitted over the detected pupil. The centre of the pupil corresponds with a centre point of the circle.

In another embodiment, the monocular PD of the subject (900) is determined by measuring a horizontal distance in each 3D model from the visual axis of each eye to the vertical line of symmetry extending through the bridge of the spectacles in one embodiment.

The monocular pupillary distances determined from the first 3D model represent distant monocular PDs for the subject. The monocular PD determined from the second 3D model, if generated, represent near monocular PDs for the subject.

The PH of the subject (900) is determined, in one embodiment, by measuring a vertical distance in each 3D model from a centre of the pupil of each eye to a lowermost inside frame edge of the spectacles for full-rimmed spectacles, or a lowermost outside frame edge of the spectacles for rimless or partially rimmed spectacles.

In another embodiment, the PH of the subject (900) is determined by measuring a vertical distance in each 3D model from the visual axis of each eye to a lowermost inside frame edge of the spectacles for full-rimmed spectacles, or a lowermost outside frame edge of the spectacles for rimless or partially rimmed spectacles The PH determined from the first 3D model represents a distant PH for the subject. The pupil height determined from the second 3D model, if generated, represents a near PH for the subject.

The vertex distance or BVD is determined from the first 3D model generated by measuring the distance between the apex of the cornea of each eye and a plane corresponding to the back vertex of the lenses in the spectacles.

The OCRD corresponds to the distance from the OCR of each eye to the back vertex of the corresponding lens of the spectacles. The OCRD is determined by measuring the shortest distance in the 3D models from the OCR of each eye to a plane corresponding to the back vertex of the lenses in the spectacles.

The pantoscopic tilt is determined from the first 3D model by measuring the angle between a plane corresponding to the frame front of the spectacles and a vertical plane extending perpendicular to the visual axis.

The frame wrap or face-form wrap of the spectacles (800) is determined by measuring in the first 3D model the angle between a plane corresponding to each of the left and right frame rims of the frame front of the spectacles and a vertical plane extending perpendicular to the visual axis.

The head cape is determined from the first 3D model by measuring the horizontal angle of head turn or orientation of the head of the subject (900) relative to a direction of sight or gaze of the subject (900) when the subject (900) is standing or seated in a configuration such that the Frankfort plane (PF) associated with the subject's head is substantially horizontal.

In some embodiments, the method (400) can further include characterising a profile shape of the lens groove or v-groove of the left and right frame rims of the spectacles (800). The profile shape of the lens groove or v-groove of the left and right frame rims of the spectacles (800) can be characterised from either the first 3D model or the second 3D model, if generated. Advantageously, accurately characterising the profile shape of the lens groove or v-groove of the left and right frame rims of the spectacles (800) assists in the edging and fitting of prescription lenses by allowing the lenses to be edged to complementarily fit the corresponding lens groove or v-groove of the spectacles (800).

Figure 8:
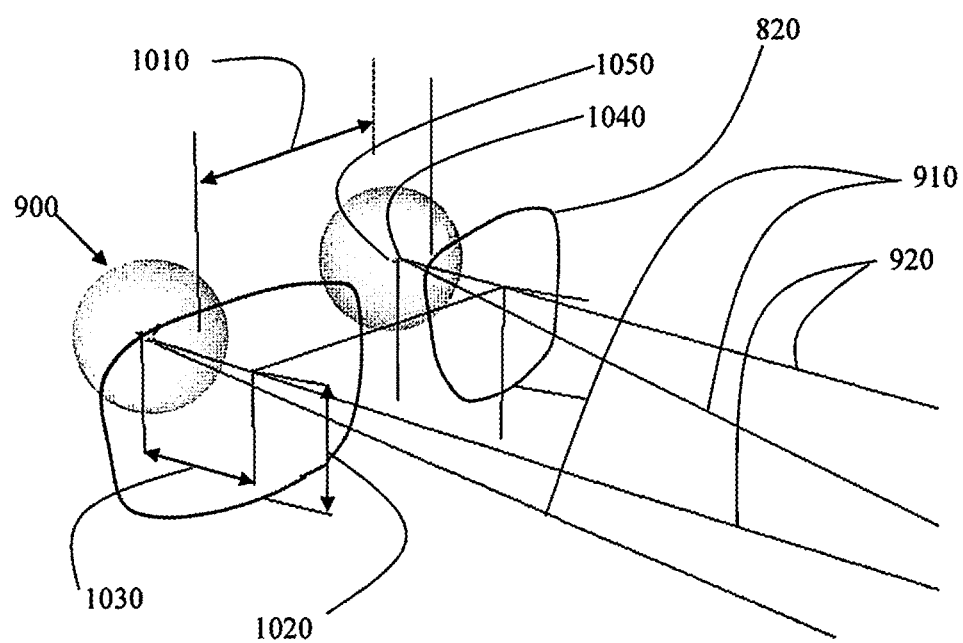
FIG. 8 is a screen capture of another 3D model of part of a subject's face wearing spectacles generated by the system as shown in any one of FIGS. 1 to 3, the 3D model shows the subject's modelled eyes relative to a v-groove of the spectacles.

With reference to FIG. 8, the monocular PD (1010), PH (1020), OCRD (1030), OCR (1040) and MCOR (1050) as described above are shown on a 3D model of part of a subject (900) relative to the v-groove (820) of the spectacles (800; not shown). The figure also shows the subject's near visual axis (910) and distance visual axis (920).

Another method (500) of using the optical measuring system (100) is now described in detail with reference to FIGS. 1 to 3, 7 and 8.

As with method (400), the method (500) may include an initial step of removing any lens inserts in the spectacles (800) to be fitted, depending on the type of spectacles (800). For rimless and/or partially rimmed spectacles, the lens inserts are not removed until later.

The method (500) optionally includes another initial step of applying a contrast agent to the spectacles (800) to enhance imaging of the spectacles (800).

The method (500) optionally includes a further initial step of adhering one or more machine recognisable tags (610) to the frame front of the spectacles (800). The machine recognisable tags (610) are each in the form of an adhesive label with an adhesive layer and an opposed outer layer presenting a mark. In preferred embodiments, a first and a second machine recognisable tag are respectively adhered to lower outer portions of the left and right frame rims of the spectacles (800; if present), a third machine recognisable tag (610) is adhered to a bridge of the spectacles (800).

At step 510, an image capturing device in the form of a hand held 3D scanner is used to image at least part of the spectacles (800) including at least the frame front of the spectacles (800). The imaging includes capturing a plurality of images of the at least part of the spectacles (800).

The imaging includes imaging the left and right frame rims of the spectacles (800), including the lens groove or v-groove, if present.

The method (500) optionally further includes another initial step of tracing the left and right frame rims of the spectacles (800) with a tracer prior to further imaging.

At step 520, the method (500) optionally initially includes removing the lens inserts of the spectacles (800) if the spectacles (800) are rimless or partially rimmed spectacles (800).

The image capturing device (110) is used to image at least part of the face of the subject (900) wearing the spectacles (800). The imaging includes capturing a plurality of images of the at least part of the face of the subject (900) wearing the spectacles (800) over a horizontal range of at least 90° of the at least part of the face of the subject (900) wearing the spectacles (800). This is achieved by using the mount (120) to move the image capturing device (110) in a lateral direction at least partially about, around or across the at least part of the face of the subject (900) wearing the spectacles (800).

The imaging includes first imaging the at least part of the face of the subject (900) wearing the spectacles (800) while the subject (900) focuses on a first object 6 m away from the subject (900). The subject (900) is imaged down the line of sight.

The imaging may optionally include a second imaging of the at least part of the face of the subject (900) wearing the spectacles (800) while the subject (900) focuses on a second object 400 mm away from the subject (900). The subject (900) is imaged while looking down at the second object.

For all imaging, the subject (900) is to be in a natural posture. For the first imaging, the subject (900) holds his or her head in an "orthostatic" position in which the Frankfort plane (PF) associated with the head of the subject (900) is substantially horizontal.

At step 530 and with reference to FIG. 7, 3D models of the at least part of the spectacles (800) and the at least part of the face of the subject (900) wearing the spectacles (800) are generated based on the images captured. The 3D models are generated by the computer operatively connected to the image capturing device (110) and the hand held 3D scanner.

A first 3D model of the at least part of the face of the subject (900) wearing the spectacles (800) is generated from the first imaging.

A second 3D model of the at least part of the face of the subject (900) wearing the spectacles (800) can optionally be generated from the second imaging, if captured.

If the image capturing device (110) is in the form of a 3D scanner, the 3D models will be generated from a point cloud produced by the 3D scanner.

If the image capturing device (110) is in the form of a stereoscopic camera system, the 3D models will be generated by a process of stereo photogrammetry.

At step 540, the 3D model of the at least part of the spectacles is aligned with each of the first 3D model and the second 3D model, if generated, to respectively obtain an aligned first 3D model and an aligned second 3D model. In some embodiments, the data collected by the tracer may be incorporated into the aligned first 3D model and the aligned second 3D model.

The 3D models are aligned such that the 3D model of the at least part of the spectacles substantially superimposes over the spectacles in each of the first and the second 3D models. The alignment can be carried out on the computer automatically or by a user manipulating the 3D models. The alignment is carried out until a good fit is achieved as determined by measuring a root mean square deviation (RMSD) between common points along the spectacles in the 3D model of the at least part of the spectacles and the first or second 3D model.

The alignment can be carried out automatically based on the machine recognisable tags (610), if present. The computer can align each of the machine recognisable tags (610) in the 3D model of the at least part of the spectacles with the corresponding machine recognisable tag (610) in each of the first and second 3D model, if generated, to achieve a good fit.

At step 550, one or more optical measurements, including MCOR of each eye, OCR of each eye, visual axis and/or pupillary axis of each eye, monocular PD, PH, BVD, OCRD, pantoscopic tilt, frame wrap or face-form wrap and/or head cape of the subject (900) are determined from the aligned first 3D model and/or the aligned second 3D model.

First, the MCOR of each eye of the subject (900) is determined from the aligned first and second 3D models. The MCOR is determined by modelling a sphere or ellipsoid over the sclera of each eye of the subject (900) in each 3D model and determining a centre point of the sphere or ellipsoid.

In some embodiments, multiple spheres or ellipsoids can be modelled over the sclera of each eye of the subject (900). The centre point of each sphere or ellipsoid modelled can then be determined and the position of the centre points averaged to determine an average centre point corresponding to the MCOR.

Typically, multiple iterations of MCOR determination may be carried out until convergence is achieved.

The OCR of each eye can then be derived from the MCOR of each eye together with the visual axis. The OCR is determined by locating or determining the visual axis of each eye and determining the shortest distance from the MCOR to the visual axis in the aligned first 3D model.

The visual axis of each eye of the subject (900) is determined from the aligned first 3D model. The visual axis is determined by axially extending an imaginary line along the line of sight through the centre of the pupil to a rear surface of the eye.

The centre of the pupil of each eye can be determined by user analysis of the aligned 3D model. The user can then model a circle over the pupil, the centre point of which represents the centre of the pupil. Alternatively, the pupil of each eye can be automatically detected and have a circle modelled over the detected pupil. Again, the centre point of the circle represents the centre of the pupil.

The pupillary axis of each eye of the subject (900) is determined from the aligned first 3D model. The pupillary axis is located by determining the apex of the cornea of each eye. The pupillary axis can then be determined as an imaginary horizontal line axially extending through the apex of the cornea to a rear surface of each eye.

The apex of the cornea of each eye can be determined by modelling spheres over the sclera and cornea of each eye of the subject in the aligned first 3D model and then identifying the greatest distance extending outwardly from a circumference of the sphere modelled over the sclera to a circumference of the sphere modelled over the cornea. The point at which a line extending along the greatest distance crosses the circumference of the sphere modelled over the cornea substantially corresponds with the apex of the cornea.

Again, as the OCR, the visual axis and the pupillary axis differ with the direction of the gaze, the OCR, the visual axis and the pupillary axis also need to be determined for the aligned second 3D model.

For the aligned second 3D model, the visual axis and/or pupillary axis is determined by: (1) aligning each eye of the subject from the aligned first 3D over the aligned second 3D model; and (2) extrapolating the position of the visual axis and/or pupillary axis in the aligned second 3D model from the position of the visual axis and/or pupillary axis in the aligned eye from the aligned first 3D model. The OCR may then be determined as described above.

The monocular PD of the subject (900) is determined by measuring a horizontal distance in each 3D model from a centre of the pupil of each eye to the vertical line of symmetry extending through the bridge of the spectacles in one embodiment. The pupil of each eye is automatically detected from each 3D model and is modelled with a circle fitted over the detected pupil. The centre of the pupil corresponds with a centre point of the circle.

In another embodiment, the monocular PD of the subject (900) is determined by measuring a horizontal distance in each 3D model from the visual axis of each eye to the vertical line of symmetry extending through the bridge of the spectacles.

The monocular PDs determined from the aligned first 3D model represent distant monocular PDs for the subject. The monocular PDs determined from the aligned second 3D model, if generated, represent near monocular PDs for the subject.

The PH of the subject (900) is determined, in one embodiment, by measuring a vertical distance in each 3D model from a centre of the pupil of each eye to a lowermost inside frame edge of the spectacles for full-rimmed spectacles, or a lowermost outside frame edge of the spectacles for rimless or partially rimmed spectacles.

In another embodiment, the PH of the subject (900) is determined by measuring a vertical distance in each 3D model from the visual axis of each eye to a lowermost inside frame edge of the spectacles for full-rimmed spectacles, or a lowermost outside frame edge of the spectacles for rimless or partially rimmed spectacles.

The PH determined from the aligned first 3D model represents a distant PH for the subject. The PH determined from the aligned second 3D model, if generated, represents a near PH for the subject.

The vertex distance or BVD is determined from the aligned first 3D model generated by measuring the distance between the apex of the cornea of each eye and a plane corresponding to the back vertex of the lenses in the spectacles.

The OCRD corresponds to the distance from the OCR of each eye to the back vertex of the corresponding lens of the spectacles. The OCRD is determined from the aligned first 3D model by measuring the shortest distance in the 3D model from the OCR of each eye to a plane corresponding to the back vertex of the lenses in the spectacles.

The pantoscopic tilt is determined from the aligned first 3D model by measuring the angle between a plane corresponding to the frame front of the spectacles and a vertical plane extending perpendicular to the visual axis.

The frame wrap or face-form wrap of the spectacles (800) is determined by measuring in the aligned first 3D model the angle between a plane corresponding to each of the left and right frame rims of the frame front of the spectacles and a vertical plane extending perpendicular to the visual axis.

The head cape is determined from the first aligned 3D model by measuring the horizontal angle of head turn or orientation of the head of the subject (900) relative to a direction of sight or gaze of the subject (900) when the subject (900) is standing or seated in a configuration such that the Frankfort plane (PF) associated with the subject's head is substantially horizontal.

The method (400) can optionally further include characterising a profile shape of the lens groove or v-groove of the left and right frame rims of the spectacles (800). The profile shape of the lens groove or v-groove of the left and right frame rims of the spectacles (800) can be best characterised from the 3D model of the at least part of the spectacles.

Advantageously, accurately characterising the profile shape of the lens groove or v-groove of the left and right frame rims of the spectacles (800) assists in the edging and fitting of prescription lenses by allowing the lenses to be edged to complementarily fit the corresponding lens groove or v-groove of the spectacles (800).

With reference to FIG. 8, the monocular PD (1010), PH (1020), OCRD (1030), OCR (1040) and MCOR (1050) as described above are shown on a 3D model of part of a subject (900) relative to the v-groove (820) of the spectacles (800; not shown). The figure also shows the subject's near visual axis (910) and distance visual axis (920).

Another method (600) of using the optical measuring system (100) is now described in detail with reference to FIGS. 1 to 3.

The method (600) optionally includes applying a water-soluble contrasting agent to the eyes of the subject (900) to enhance imaging of any ocular disease and/or disorder.

At step 610, the image capturing device (110) is used to image at least an eye region of the subject (900). The imaging includes capturing a plurality of images of the at least an eye region of the subject (900) over a horizontal range of at least 90°. This is achieved by using the mount (120) to move the image capturing device (110) in a lateral direction at least partially about, around or across the subject (900).

For all imaging, the subject (900) is to be in a natural posture with his or her head in an "orthostatic" position in which the Frankfort plane (PF) associated with the head of the subject (900) is substantially horizontal.

At step 620, a 3D model of the at least an eye region of the subject (900) is generated based on the images captured. The 3D model is generated by the computer operatively connected to the image capturing device (110).

If the image capturing device (110) is in the form of a 3D scanner or near-IR interferometer, the 3D model will be generated from a point cloud produced by the 3D scanner or near-IR interferometer.

If the image capturing device (110) is in the form of a stereoscopic camera system, the 3D model will be generated by a process of stereo photogrammetry.

At step 630, one or more ocular diseases and/or disorders can be diagnosed and/or monitored by visual inspection of the 3D model generated.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An optical measuring system for fitting spectacles to a subject, said system comprising:
   at least one image capturing device for capturing at least one image of at least part of the spectacles and at least one image of at least part of a face of the subject wearing the spectacles;
   at least one movable mount for mounting the image capturing device in front of the subject and moving the image capturing device relative to the subject; and
   at least one processor operatively connected to the at least one image capturing device, said processor configured to: generate 3D models of the at least part of the spectacles and the at least part of the face of the subject wearing the spectacles; align the 3D models generated; and determine, based on the 3D models once aligned, one or more optical measurements, further comprising at least one of a visual axis, a MCOR and an OCR of each eye of the subject.

2. The system of claim 1, wherein the at least one image capturing device comprises a near-infrared (IR) interferometer for near-IR spectroscopic analysis of the at least part of the face of the subject.

3. The system of claim 1, wherein the at least one image capturing device further comprises at least one sensor and at least one emitter capable of emitting radiation selected from the group consisting of light, infrared, near infrared and X-rays or soundwaves in the form of ultrasound.

4. The system of claim 3, wherein the at least one emitter, in use, emits radiation or soundwaves that are reflected off the at least part of the face of the subject wearing the spectacles and/or the at least part of the spectacles for generating the 3D model of the at least part of the spectacles or the face.

5. An optical measuring system for fitting spectacles to a subject, said system comprising:
   at least one machine recognisable tag associated with the spectacles;
   at least one image capturing device for capturing at least one image of at least part of the spectacles and at least one image of at least part of a face of the subject wearing the spectacles;
   at least one movable mount for mounting the image capturing device in front of the subject and moving the image capturing device relative to the subject; and
   at least one processor operatively connected to the image capturing device, said processor configured to: generate 3D models of the at least part of the spectacles and the at least part of the face of the subject wearing the spectacles; align the 3D models generated, based on the at least one machine recognisable tag; and determine, based on the 3D models once aligned, one or more optical measurements, comprising at least one of a visual axis, a MCOR and an OCR of each eye of the subject.

6. The system of claim 5, wherein the system comprises at least three machine recognisable tags, each tag being the form of an adhesive label configured to be adhered to a portion of the frame front of the spectacles in a triangular arrangement.

7. A method of fitting spectacles to a subject, said method comprising:
   imaging at least part of the spectacles and at least part of a face of the subject wearing the spectacles to generate 3D models of the at least part of the spectacles imaged and the at least part of the face imaged;
   aligning the 3D models generated; and
   determining one or more optical measurements of the subject from the 3D models once aligned, further comprising at least one of a visual axis, a MCOR and an OCR of each eye of the subject.

8. The method of claim 7, wherein the imaging at least part of a face of the subject wearing the spectacles comprises imaging the subject while moving the image capturing device at least partially about, around or across the at least part of a face of the subject.

9. The method of claim 8, wherein the imaging further comprises imaging the at least part of the face of the subject wearing the spectacles while the subject is focusing on objects at different distances or lengths from the subject.

10. The method of claim 7, wherein the imaging at least part of the spectacles is carried out with a 3D scanner.

11. The method of claim 7, wherein the MCOR of each eye is determined by modelling a sphere or ellipsoid over the sclera of the eye of the subject in the 3D model generated and determining the centre point of each sphere or ellipsoid.

12. The method of claim 7, wherein the MCOR of each eye is determined by modelling more than one sphere or ellipsoid over the sclera of each eye of the subject in an averaged and integrated 3D model derived from 3D models of the sclera aligned relative to one another and averaged prior to being integrated with the 3D model of the subject focusing at a long focal length, wherein the centre point of each sphere or ellipsoid modelled is then determined and the position of the centre points averaged to determine an average centre point corresponding to the MCOR.

13. The method of claim 7, wherein the visual axis is determined from the 3D model of the subject focusing at long focal lengths by axially extending an imaginary line along the line of sight through the centre of the pupil of the eye to a rear surface of the eye.

14. The method of claim 7, wherein the OCR is determined for each eye by locating or determining the visual axis of each eye and then determining the shortest distance from the MCOR to the visual axis to thereby determine the OCR.

15. The method of claim 7, wherein the determining further comprises measuring a monocular pupillary distance (PD) of each eye of the subject.

16. The method of claim 15, wherein the PD of each eye is determined by measuring a horizontal distance in the 3D model generated from the visual axis of each eye to a vertical line of symmetry extending through a bridge of the spectacles.

17. The method of claim 7, wherein the determining further comprises measuring a pupil height (PH) of each eye of the subject.

18. The method of claim 17, wherein the PH of each eye is determined by measuring a vertical distance in the 3D model generated from a centre of the pupil of each eye to a lowermost inside frame edge of the spectacles (i.e., for fully rimmed spectacles) or a lowermost outside frame edge of the spectacles (i.e., for rimless or partially rimmed spectacles).

19. The method of claim 7, wherein the determining further comprises measuring a pantoscopic tilt of the spectacles being worn by the subject.

20. The method of claim 19, wherein the pantoscopic tilt is determined by measuring in the 3D model generated the angle between a plane corresponding to a frame front of the spectacles and a vertical plane extending perpendicular to the visual axis.

* * * * *